United States Patent [19]

Baun et al.

[11] 4,280,193
[45] Jul. 21, 1981

[54] DATA LINK PROCESSOR FOR MAGNETIC TAPE DATA TRANSFER SYSTEM

[75] Inventors: Kenneth W. Baun; Jimmy G. Saunders, both of El Toro, Calif.

[73] Assignee: Burroughs Corporation, Detroit, Mich.

[21] Appl. No.: 103,743

[22] Filed: Dec. 14, 1979

[51] Int. Cl.³ ............................ G06F 3/04; G06F 3/06
[52] U.S. Cl. ........................................................ 364/900
[58] Field of Search ... 364/900 MS File, 200 MS File

[56] References Cited

U.S. PATENT DOCUMENTS

| 4,028,538 | 6/1977 | Olander Jr. et al. | 364/900 X |
| 4,080,649 | 3/1978 | Calle et al. | 364/200 |
| 4,106,092 | 8/1978 | Millers | 364/200 |
| 4,123,795 | 10/1978 | Dean, Jr. et al. | 364/200 |
| 4,162,520 | 7/1979 | Cook et al. | 364/200 |

Primary Examiner—Harvey E. Springborn
Attorney, Agent, or Firm—Alfred W. Kozak; Nathan Cass; Kevin R. Peterson

[57] ABSTRACT

A peripheral controller, designated as a data link processor, is used for linking a main host computer system with a plurality of magnetic tape transport units. Upon receipt of instructions from the main host system, the data link processor will initiate operations for the sending and receiving of data from a plurality of magnetic tape units and relieve the main host system of all housekeeping functions required for data transfers. The data link processor is made up of two units which may be mounted on separate slide-in printed circuit cards. The first unit is a standardized common unit for all types of data link processors and is known as the Common Front End. It provides micro-code storage which is used to effectuate various read, write, control and transfer operations. The second unit is designated as a Peripheral Dependent Board providing the transmission-reception interface to the peripheral magnetic tape units.

13 Claims, 11 Drawing Figures

DLP MODULE ASSEMBLY

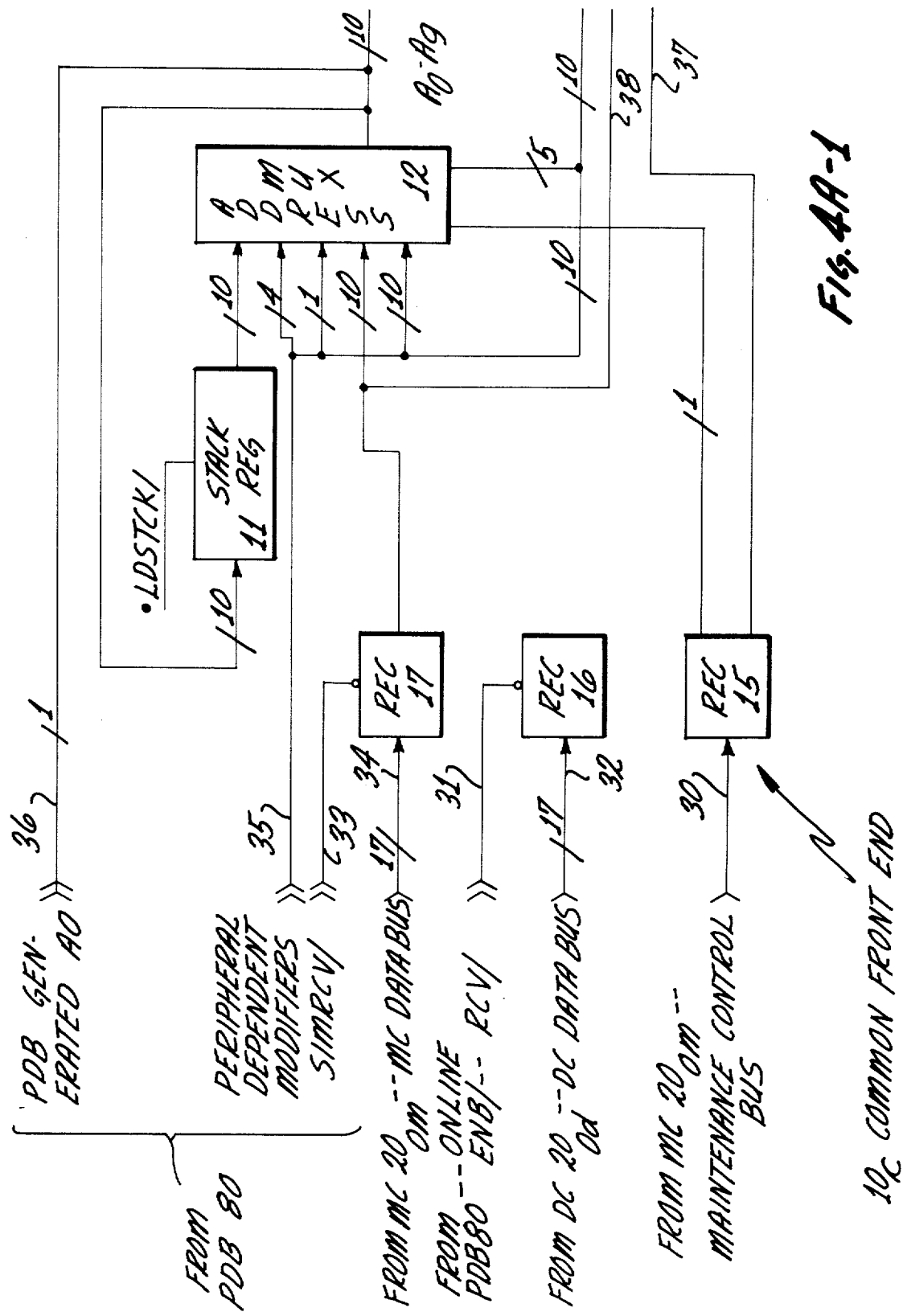

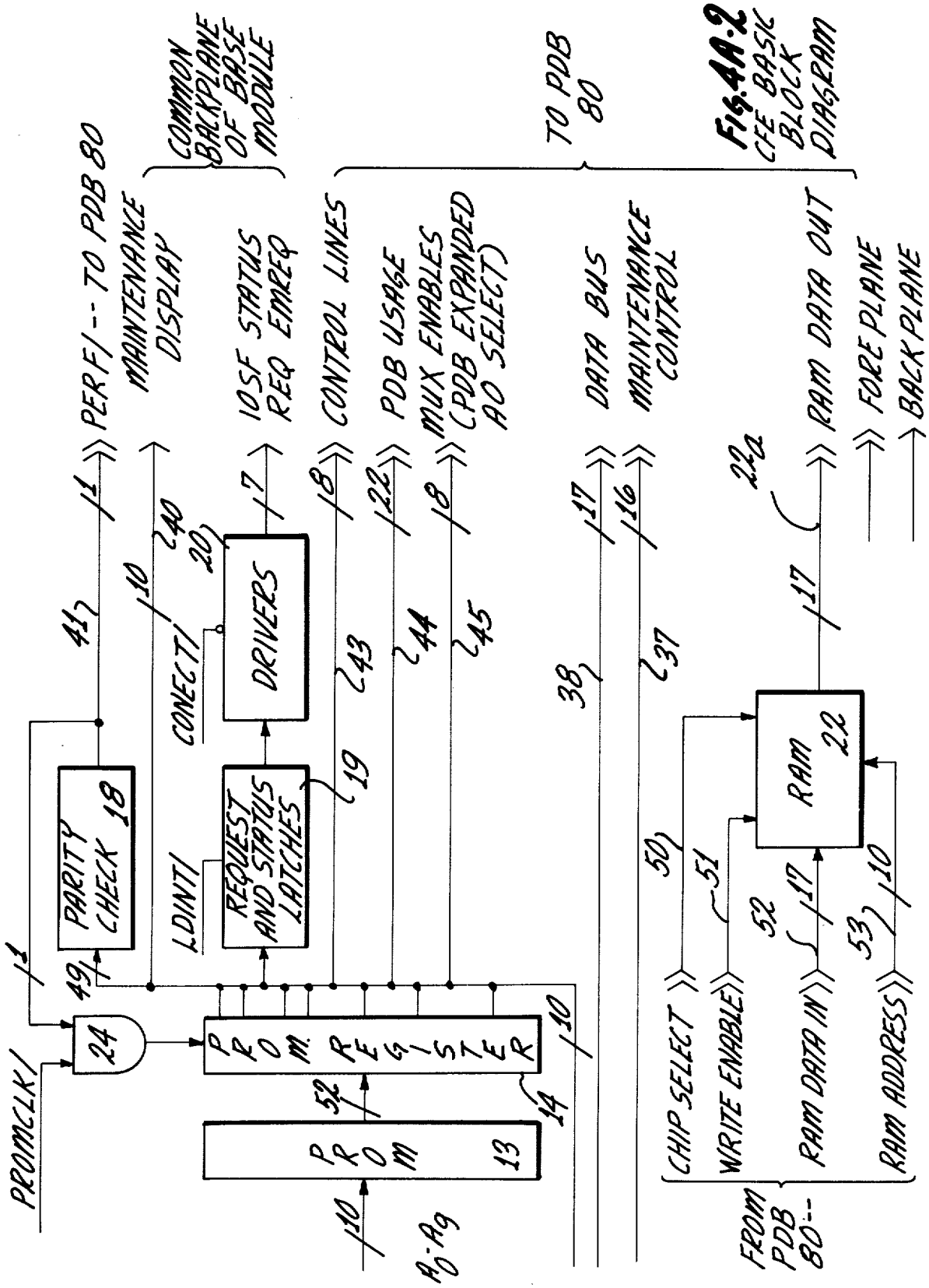

CFE CLEAR CIRCUITRY

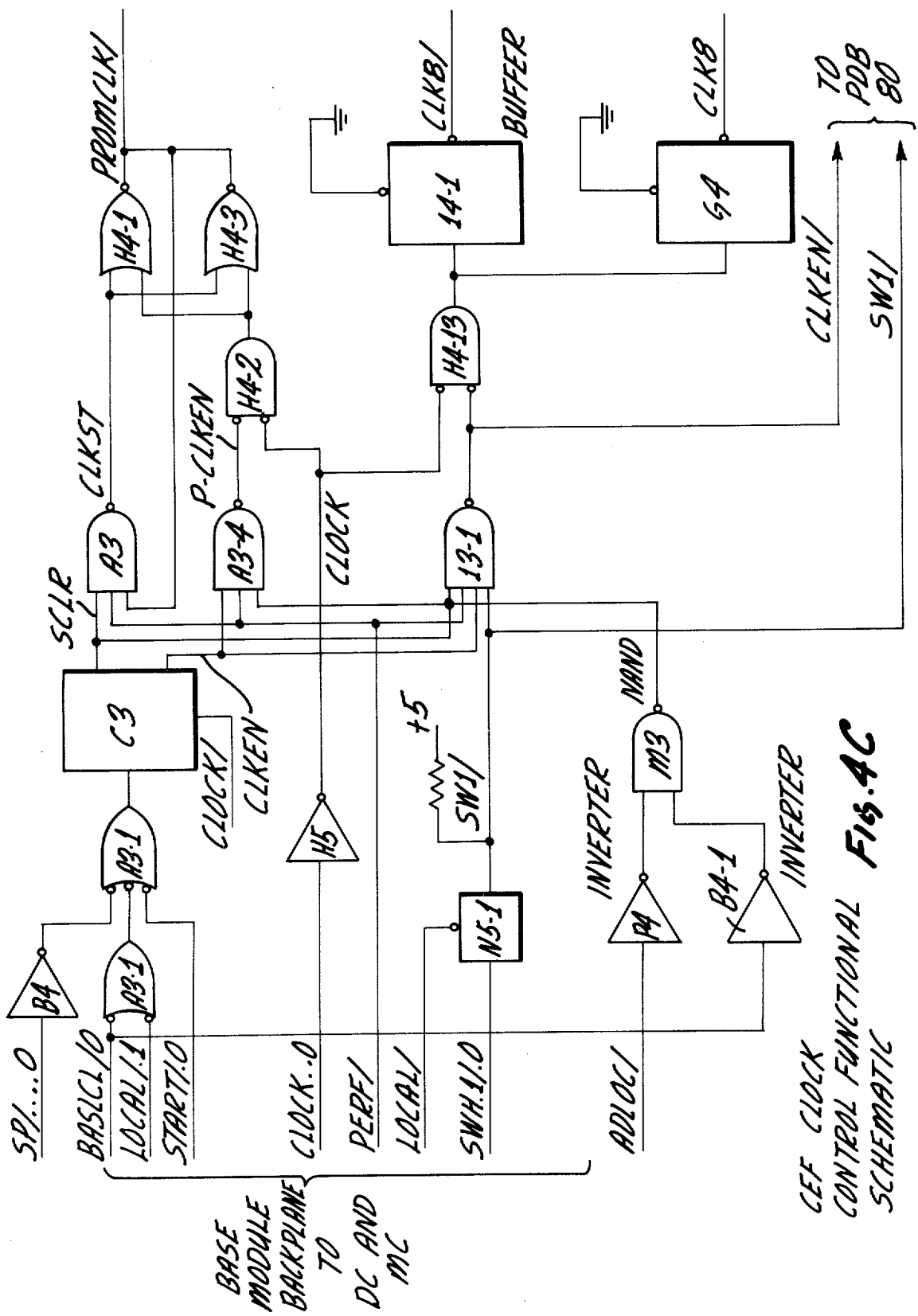

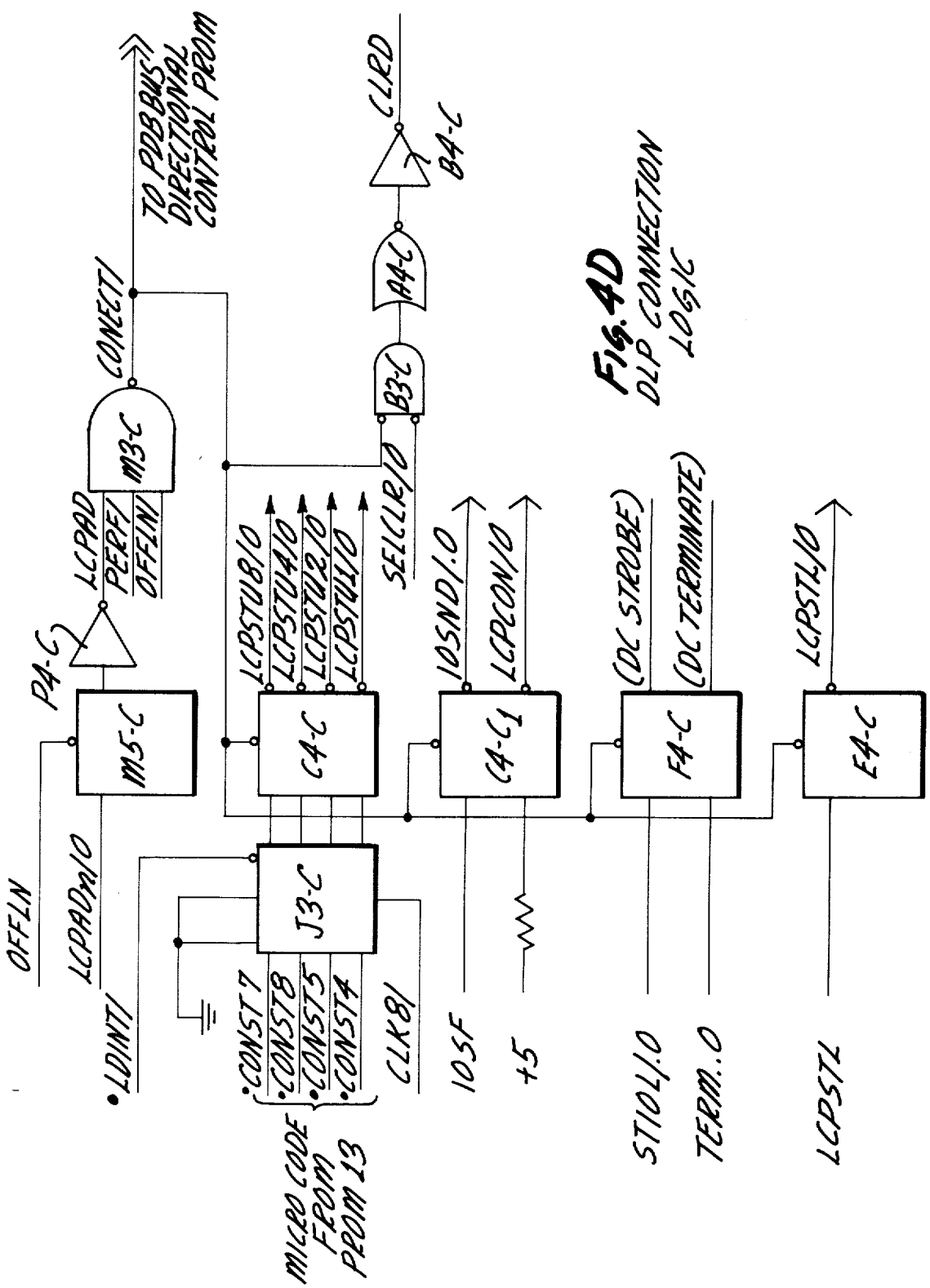

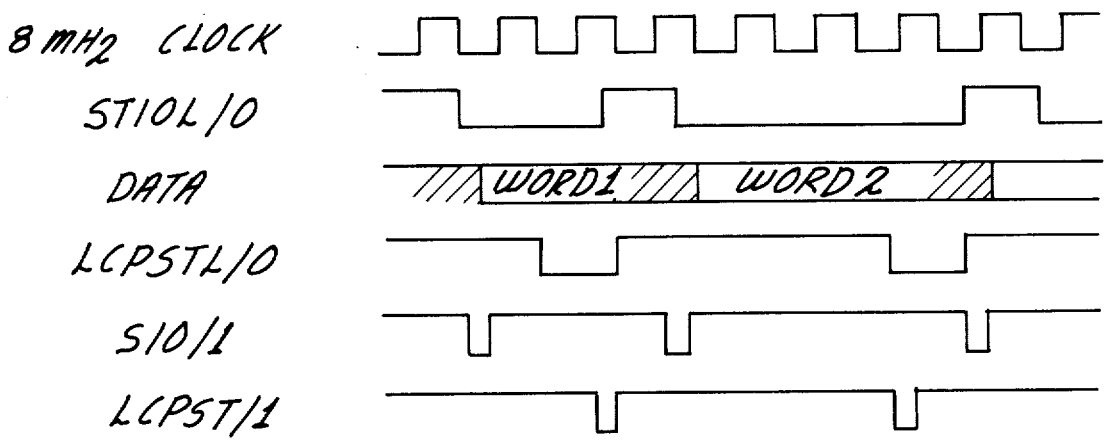

FIG. 4E DATA TRANSFER TIMING DIAGRAM DISTRIBUTION CORD-DLP INTERFACE

FIG. 5C

EMT-DLP QUEUE ORGANIZATION

| | 15 14 13 12 11 10 9 8 7 6 5 4 3 2 1 0 P | |
|---|---|---|
| Q0 | OP PENDING FLAG | |
| Q1 | 1ST DESC WORD | |
| Q2 | (OPT) 2ND DESC WORD | |
| Q3 | 1ST DESC LINK WORD | |
| Q4 | 2ND DESC LINK WORD | |
| Q5 | 3RD DESC LINK WORD | |
| Q6 | (OPT) 1ST RESULT DESC WORD | |
| Q7 | (OPT) 2ND RESULT DESC WORD | |
| Q8 | (OPT) INITIATE WORD | |
| Q9 | • ID WORD | |
| Q10 | DATA TRANSFERRED FLAG | F P |
| Q11 | RLTMB | F P |
| Q12 | RSTMB | F P |
| Q13 | NOT USED | |
| Q14 | NOT USED | |
| Q15 | NOT USED | |

TEMPORARY FLAGS: Q10, Q11, Q12

• ID WORD LOCATED AT UNIT ZERO ONLY
F = FLAG (BIT D1)
P = PARITY
(OPT) = OPTIONAL: NOT REQUIRED BY SOME OPS

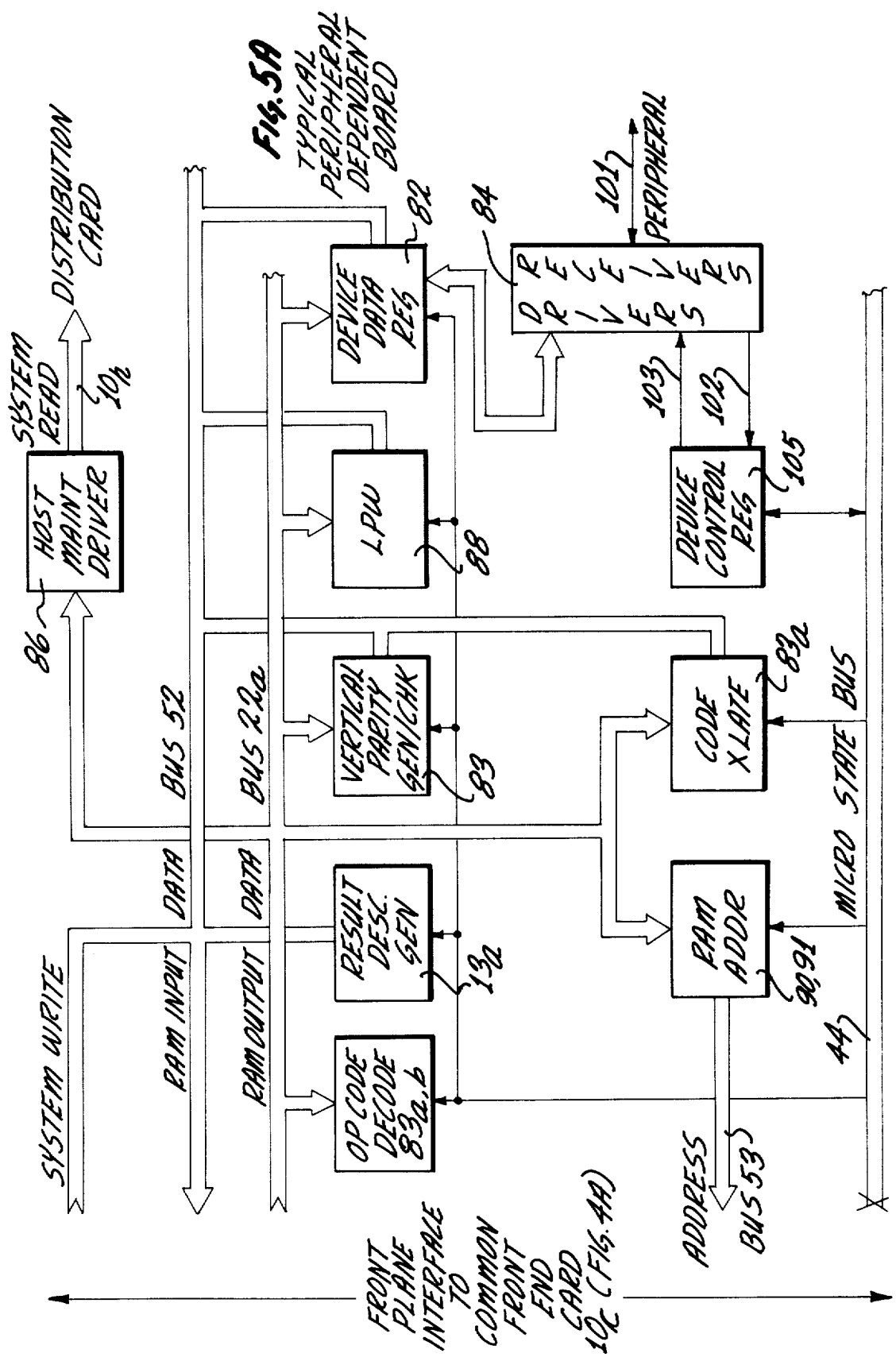

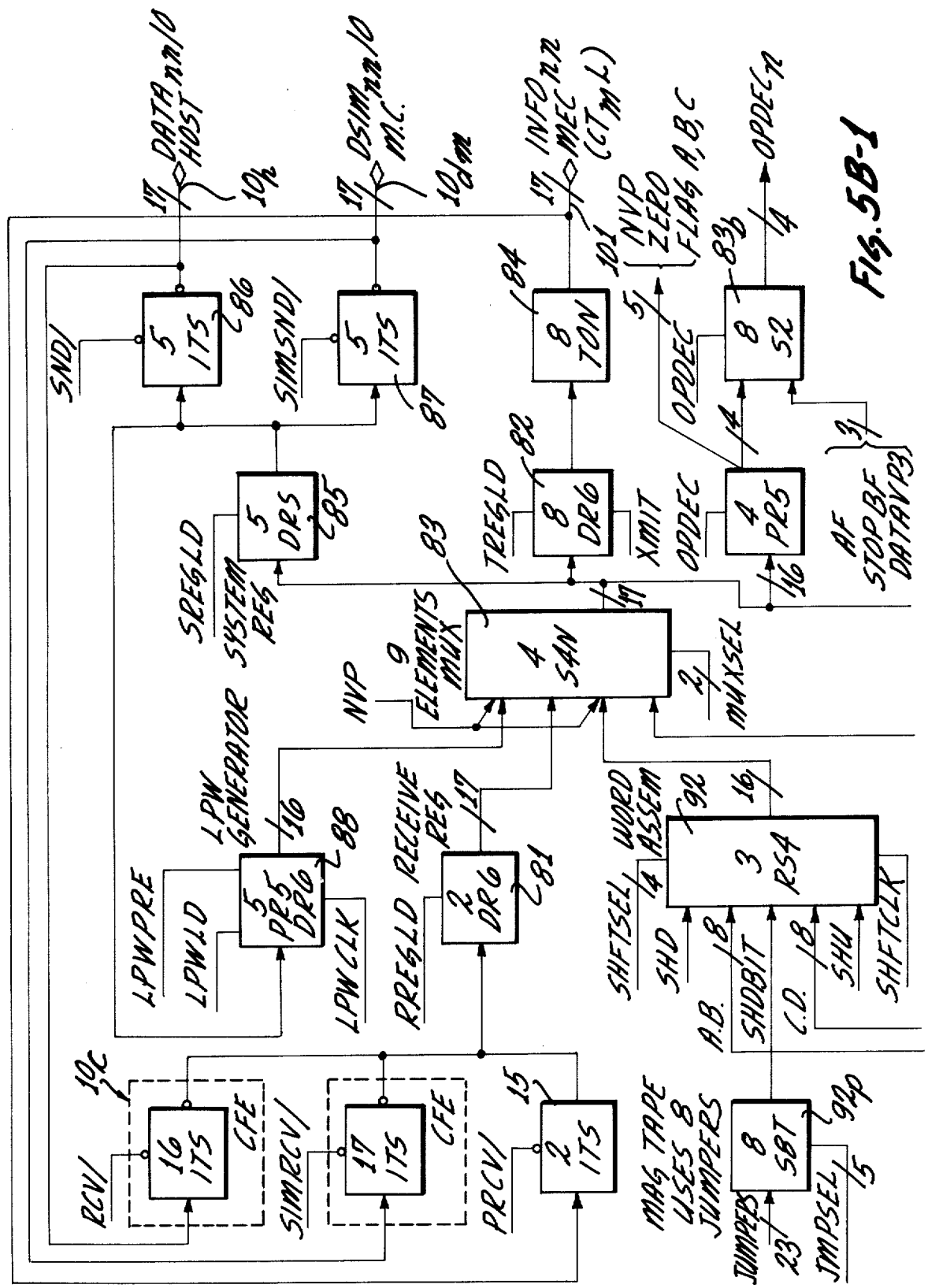

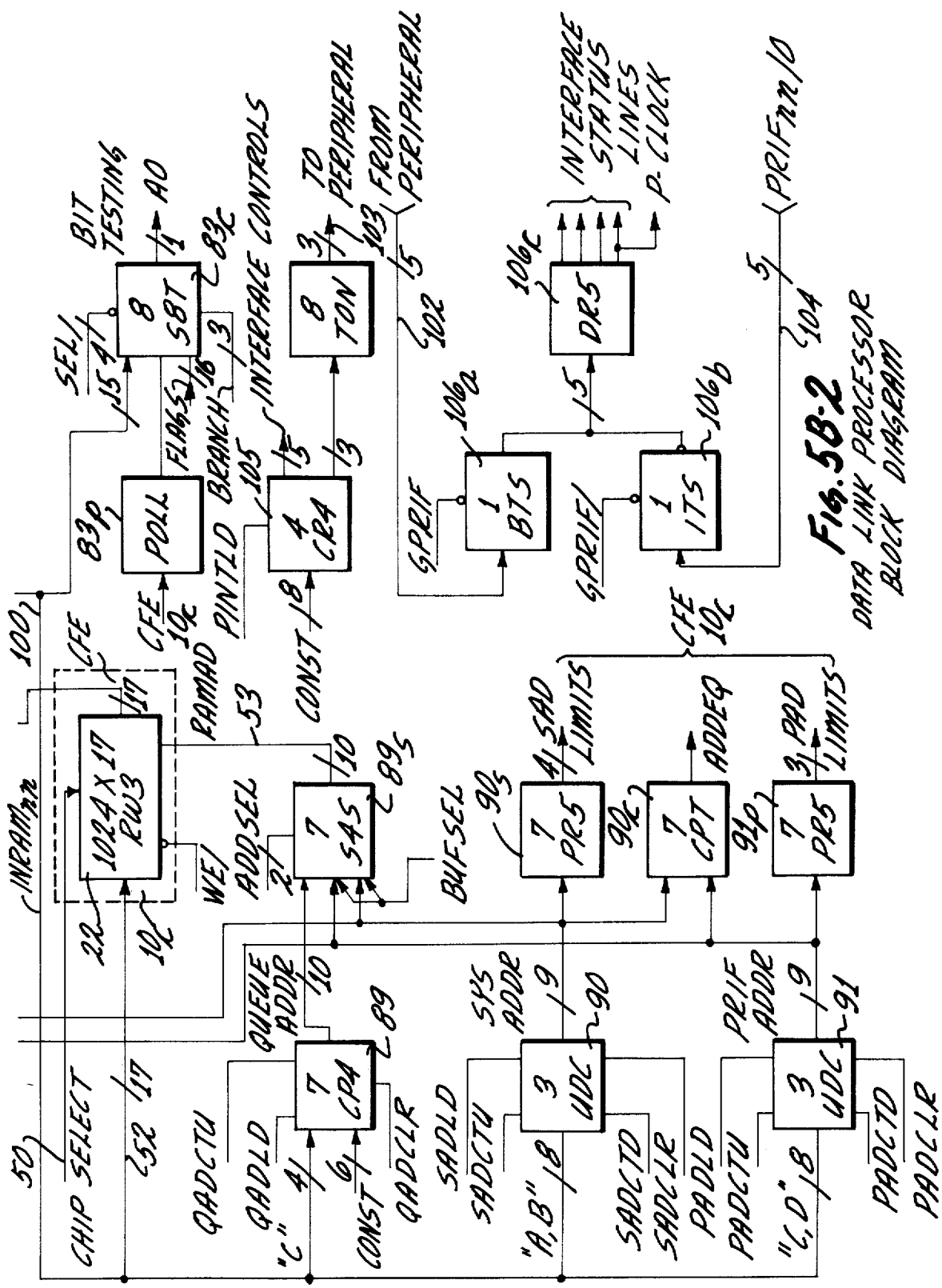

DATA LINK PROCESSOR FOR MAGNETIC TAPE DATA TRANSFER SYSTEM

LIST OF TABLES

Table O-SS Status States

Table I: CFE Glossary

Table II: Backplane Signals on Distributor Card interfaces to CFE

Table III: Backplane Signals between CFE and Maintenance Card

Table IV: CFE Foreplane Connectors

Table V: PDB-Peripheral Connector

Table VIa: 49-bit Micro-code Word (22-48)

Table VIb: 49-bit Micro-code Word (00-21)

Table VII: Address codes: Maintenance Card to CFE DLP Maintenance Mode Addressing Table VIII: Maintenance Card Lines for Driving PROM Address Lines (A0–A9)

Table IX: CFE Signals displayed with given Display Select Codes

Table Xa: CFE-PROM Address Selection

Table Xb: Enable Lines for Expanded AO Selection

Table XI: RAM Address Selection (5—5)

Table XII: Encoded Function (5-6)

Table XIII: Shift Register Control (5-7)

Table XIV: INRAM Bus Selection (5-8)

Table XV: Least Bit Selection (AO) (5-9)

CROSS REFERENCES TO RELATED APPLICATIONS AND PATENTS

The following cases which involve the use of an input-output subsystem connecting a main host computer and various peripheral units are included herein by reference.

U.S. Pat. No. 4,162,520, inventors Darwen Cook and Donald Millers, II. The case described the peripheral-controller known as a Line Control Processor which controlled and handled data transfers between a given peripheral terminal unit and the main host system.

U.S. Pat. No. 4,074,352 entitled "Modular Block Unit for I/O Subsystem", inventors Darwen Cook and Donald Millers, II. This case described a base module unit which housed and supported a group of eight peripheral-controllers and interfaced them to a main host computer system.

U.S. Pat. No. 4,106,092, entitled "Interface System Providing Interfaces to Central Processing Unit and Modular Processor-Controllers for I/O Subsystem", inventor Donald Millers, II. This patent described a unit in the main host system, designated as an I/O translator or "IOT", which controls and regulates data transfer between the main host system and a plurality of base modules and their peripheral-controllers.

U.S. Ser. No. 871,144, entitled "Input/Output Subsystem for Digital Data Processor System", and now U.S. Pat. No. 4,189,769, inventors Darwen Cook and Donald Millers, II. This case describes a subsystem wherein a plurality of peripheral-controllers are organized in base modulates for data communications with a main host system. The peripheral-controllers and the base module form an input-output subsystem for controlling data transfers to/from a large number of peripheral units to the main host computer system.

A patent application U.S. Ser. No. 103,451 entitled "Common Front End For Peripheral Controller", filed Dec. 14, 1979, inventor Kenneth Baun.

A patent application U.S. Ser. No. 103,739 entitled "I/O Subsystem Using Data Link Processors", filed Dec. 14, 1979, inventors Kenneth Baun and Donald Millers II.

A patent application U.S. Ser. No. 103,452 entitled "Peripheral Dependent Circuit For Peripheral Controller", filed Dec. 14, 1979, inventor Kenneth Baun.

The above issued patents form a foundation and background for the present application and are included by reference into this specification.

SUMMARY OF INVENTION

The basic functions of a data link processor (or intelligent I/O interface control unit as it was previously called in the cited patents) is to provide the specific processing and control functions for data transfers between a specific peripheral and a main host computer system.

There has newly been developed an improved peripheral controller (data link processor) which, instead of being individually designed and oriented for one particular type of peripheral, now had isolated certain common function elements for all types of peripheral-controllers to form a data link processor of improved capability. The common-to-all unit is designated as the Common Front End which forms a basic part of the data link processor. This Common Front End, when used in conjunction with a Peripheral Dependent Logic Board (which adapts the data link processor to a particular peripheral unit) is known as a Common I/O data link processor.

The line control processor (peripheral-controller) in U.S. Pat. No. 4,162,520 was described as an input-output interface data transfer control unit. While many of the general overall operating functions remain the same in regard to following the commands of I/O descriptors from the main system and the returning of Result Descriptors to the main system, the improved peripheral-controller now designated as the "data link processor" (DLP) provides a PROM with micro-code words for use of the required control functions rather than the complexities of processor logic and plurality of multiplexers used in the peripheral-controller line control processor described in U.S. Pat. No. 4,162,520.

The improved peripheral-controller, now designated as the "data link processor", is made of two functional units which comprise (a) a Common Front End (CFE) card which provides the control logic and micro-code words for the handling of data transfers and a (b) Peripheral Dependent Board (PDB) which interfaces the peripheral device and provides the line discipline and protocols suitable to the requirements of the particular peripheral device. The Common Front End card is a standardized unit for all different types of peripheral devices used except for the actual micro-card which is loaded into its PROM. The Peripheral Dependent Board is individually tailored to the line disciplines, protocols and other requirements of any individual type of peripheral unit.

Thus a peripheral-controller for an I/O subsystem can be efficiently formed of a universally-common unit (Common Front End) which is a standardized unit plus a unit (PDB) specifically tailored to interface the peripheral device.

The embodiment described herein is a data-link processor for operation with a plurality of magnetic tape transport units (MTTU) which are connected to an interface module called the Master Electronic Control (MEC). RAM buffer storage is provided to temporarily store data being transferred. The buffer is organized to provide 16 addressable scratch pad areas called "Queues" to hold pertinent control data for each of the individual ones of the 16 magnetic tape units.

BRIEF DESCRIPTION OF THE DRAWINGS

FIG. 4A is a circuit diagram of the common front end card of the data link processor; FIG. 4C shows the clock control circuitry for the CFE; FIG. 4D shows the connection logic circuitry of the common front end; FIG. 4E is a timing diagram showing how data transfers are effectuated during certain clock periods.

FIG. 5A is a general block diagram of a typical Peripheral Dependent Board; FIG. 5B is a circuit block diagram for the entire data link processor; FIG. 5C is a schematic drawing of the queue organization in the RAM buffer for the magnetic tape data link processor.

Figure 1:
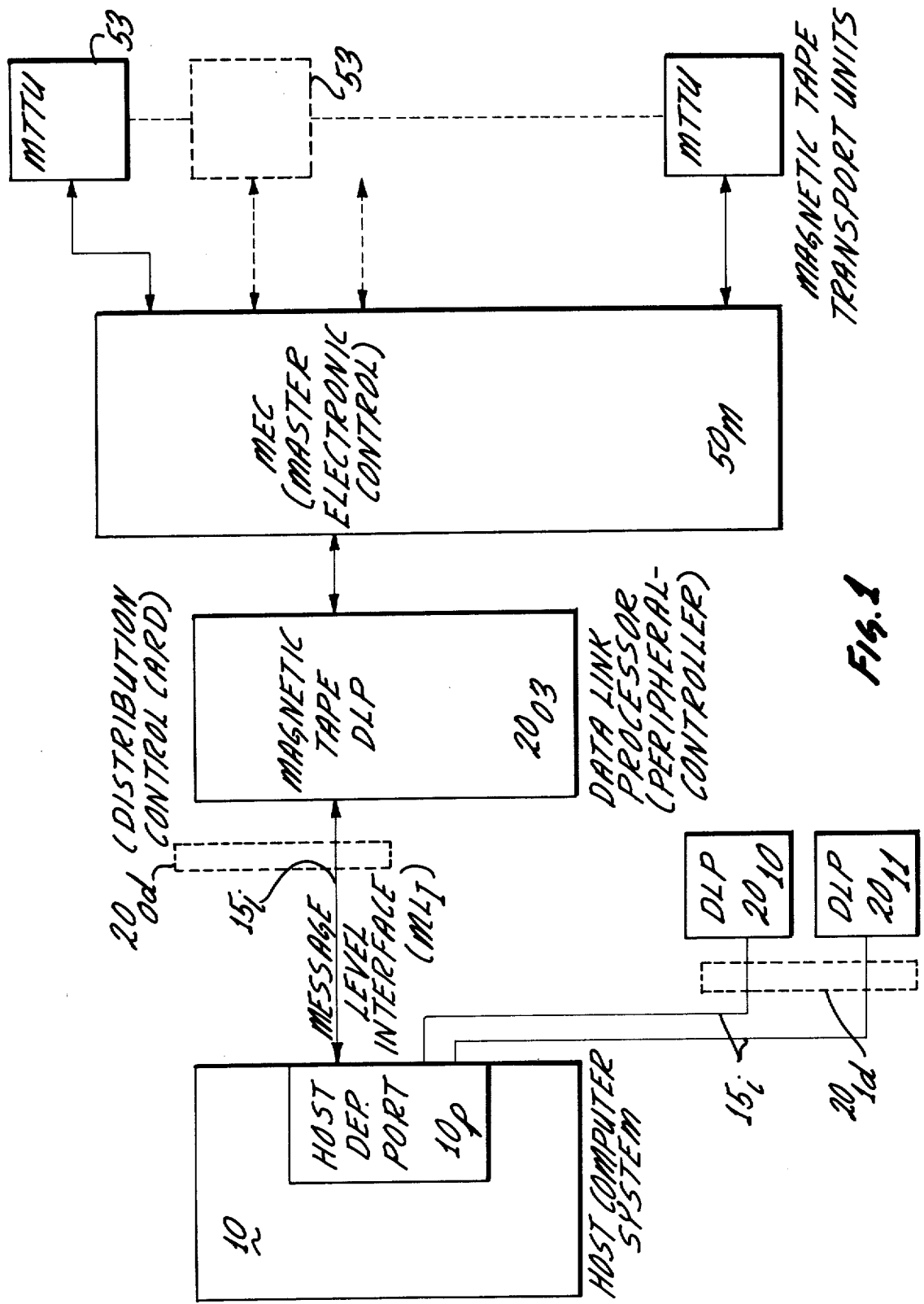
FIG. 1 is an overall system diagram showing the relationship of the data link processor to the main host system and the peripheral terminal units.

The overall environment or system configuration in which a data link processor, such as a magnetic tape data link processor (MT-DLP) operates, is shown in FIG. 1. The main host computer system 10 having a host dependent port $10_p$, connects message level interface buses $15_i$ to specialized peripheral-controllers such as data link processor DLP $20_{10}$ and $20_{11}$ through a distribution control card $20_{1d}$. Likewise, the message level interface $15_i$ connects to a distribution control card (DC) $20_{0d}$, which supports a plurality of other data link processors, such as the magnetic tape DLP $20_{03}$.

In the particularly preferred system embodiment for the magnetic tape data link processor, the DLP $20_{03}$ is connected by bus to a Master Electronic Control (MEC) $50_M$. The MEC $50_M$ may connect to and control up to 16 magnetic tape transport units (MTTU) 53. The Master Electronic Control has been described in a publication entitled B 9495 Magnetic Tape Subsystem Technical Manual copyright 1976, Burroughs Corporation, Detroit, Mich. 48232 at pages 31 through 46.

Figure 2:
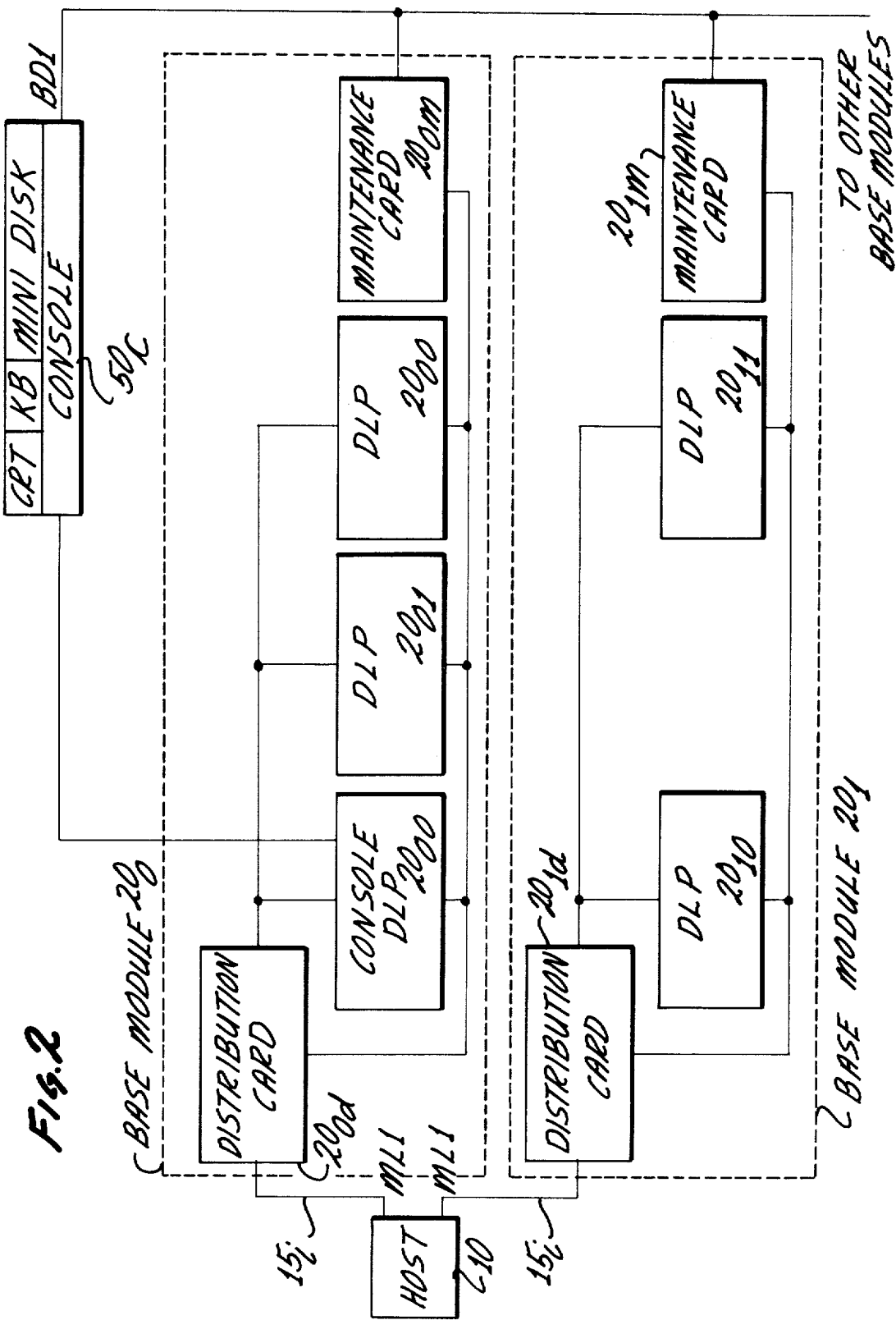
FIG. 2 is a block diagram of a plurality of typical base modules which house and support a plurality of data link processors.

FIG. 2 shows a more generalized situation in which a host computer 10 is connected by a message level interface $15_i$ to two base modules $20_0$ and $20_1$. Each of these base modules has its own respective distribution cards (DC) respectively designated $20_{0d}$ and $20_{1d}$.

Each base module supports a plurality of data link processors (peripheral-controllers). For example, base module $20_0$ may have a console data link processor $20_{00}$ which controls a console unit $50_c$. Likewise, data link processors $20_{01}$, $20_{02}$ may respectively handle control and data communication transfers between items such as a card printer, card punch or other peripheral units. Each particular data link processor is specifically oriented for serving the requirement of each type of peripheral unit.

Likewise, base module $20_1$ has its own distribution card (DC) $20_{1d}$ which can connect to data link processors such as $20_{10}$, $20_{11}$, each of which data link processors is specifically tailored to handle the data transfer and control operation for a particular type of peripheral terminal unit. Each base module will be seen to have its own maintenance card unit ($20_{0m}$ for base module $20_0$ and maintenance card $20_{1m}$ for base module $20_1$). The maintenance card provides diagnostic and maintenance coperations for the data link processors of a given base module.

As previously described in U.S. Pat. Nos. 4,106,092 and 4,162,520, each base module has a series of backplane connectors and grooved slides whereby a large number of printed circuit-component cards may be inserted and slid-in for connection to the backplane of the base module. Thus, the distribution card $20_{0d}$, the maintenance card $20_{0m}$ and other printed circuit cards which constitute the peripheralcontrollers or other function cards, may be inserted and connected into the common backplane of the base module.

Figure 3:
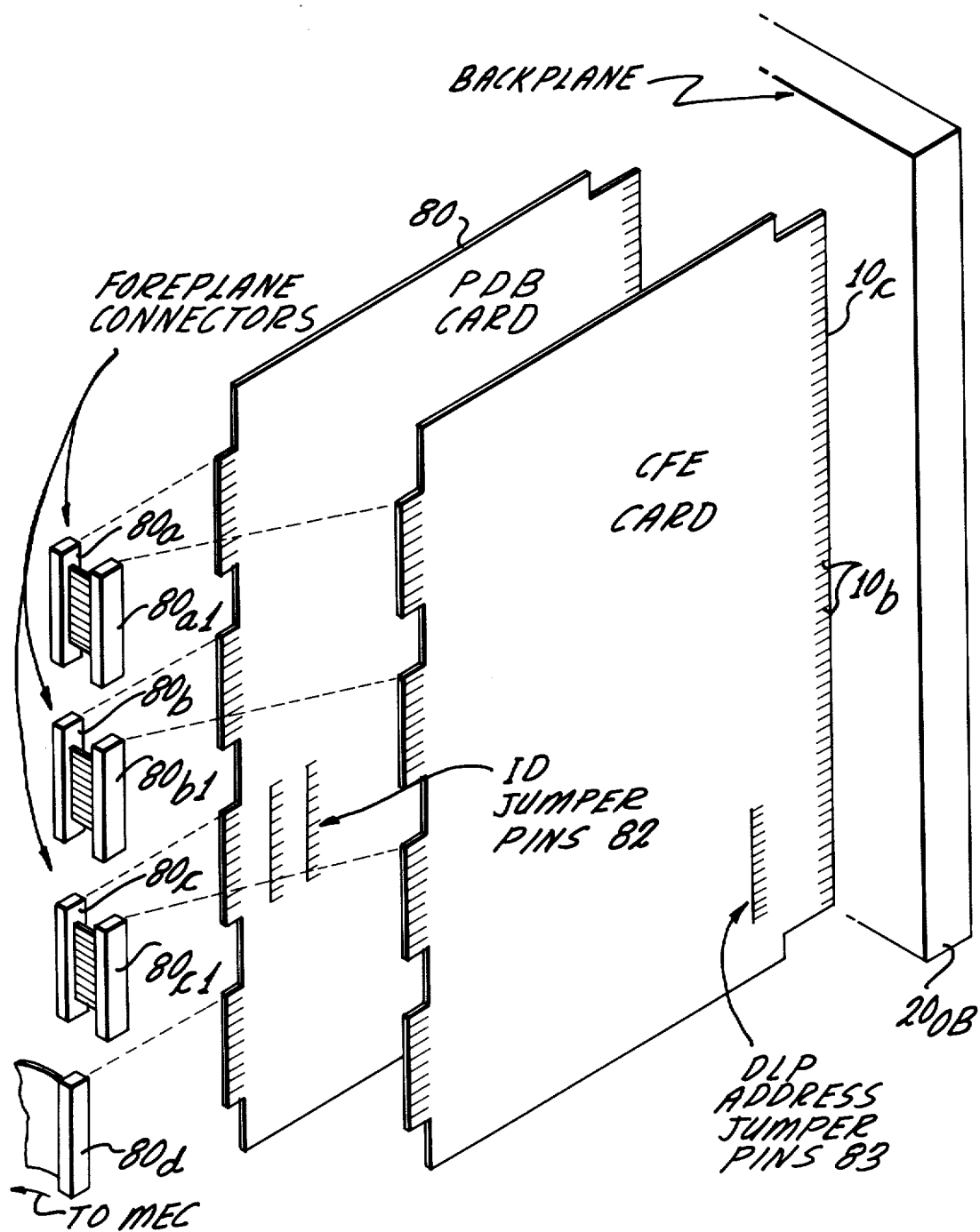
FIG. 3 is a schematic drawing of the printed circuit cards which make up the data link processor.

FIG. 3 is a schematic illustration of how a specific data link processor (peripheral-controller) may be physically structured with slide-in printed circuit cards. Thus, a Common Front End card $10_c$ is seen having a series of backplane connections $10_b$, for connection to the motherboard of the base module, and having frontplane or foreplane connectors $80_{a1}$, $80_{b1}$, $80_{c1}$, and DLP address jumper pins 83 which are used to set the specific address of the particular data link processor (DLP) involved.

Connected to the CFE card $10_c$ by means of the foreplane connectors is the Peripheral Dependent Board (PDB) card 80. This card has foreplane connectors $80_a$, $80_b$, $80_c$, which connect to its associated Common Front End (CFE) card $10_c$. The Peripheral Dependent Board 80 also has a foreplane connector $80_d$ for connection to the MEC, Master Electronic Control unit $50_M$. The PDB card 80 has jumper pins 82 for identification (ID) whereby an encoded identification signal for the board can be effectuated.

Thus, the specialized data link processor (peripheral controller) as $20_{03}$ can be seen to comprise two slide-in cards, one of which, the Common Front End card $10_c$, is common to all types of peripheral controllers; while the Peripheral Dependent Board, PDB card 80, is a specialized card providing the circuitry functions required for the control, handling and specialized protocols particularly required for a specific type of peripheral unit.

OVERALL SYSTEM DESCRIPTION

As previously discussed in U.S. Pat. Nos. 4,162,520 and 4,106,092, use was made of an input/output subsystem operating between a main host computer and one or more peripheral devices. The input/output subsystem used a plurality of base module cabinets, each of which supported a group of base modules. The base modules consisted of up to eight "Line Control Processors" (peripheral-controllers) which were designated as intelligent input/output processing units which controlled data transfers between any specific peripheral device and the main host system. Since these Line Control Processors (LCP) provided an identification code or "data link" for each task assigned by the main host system, these Line Control Processors came, in subsequent design, to be known as Data Link Processors (DLP) and henceforth will be referred to by the term of Data Link Processors.

The data link processor I/O subsystem interfaces a variety of peripheral (I/O) devices with one, or more than one, host system. This setup simplifies the I/O device maintainability by allowing maintenance of the I/O subsystem to be performed without being specifically tailored to the vagaries of main host systems. The data link processor subsystem is distinguished by its adaptability to any host computer system having the MLI (message level interface) capabilities described in U.S. Pat. Nos. 4,162,520 and 4,106,092.

The data link processor I/O subsystem can be utilized by host systems having totally different internal characteristics, for example, the same I/O subsystem may be shared by any combination of different Burroughs B 900 systems, as the B 2900, B 3900, B 4900 and the B 6900 system.

The message level interface is a connected line discipline by which the host system or host systems communicate with the I/O subsystem. In the preferred embodiment of the latest configuration, each of the host systems utilizes a unit called a Host Dependent Port (HDP) to achieve the message level communication.

The peripheral devices which are attached to and operate with a data link processor I/O subsystem operate in a semi-autonomous environment, that is, a host system must initiate a peripheral device to perform an operation, by sending the data link processor an I/O descriptor. After the DLP is initiated, it (DLP) performs the operation (OP) independently of the host system. At the conclusion of the operation, the DLP reconnects back to the host system which initiated the operation and returns information called a "result descriptor" (R/D). During this operation, the DLP can "reconnect" to the host system to transfer data via the data link processor.

The ability of a DLP to disconnect from a host system and proceed with an I/O transfer operation frees the host system to perform other operations during the time that an I/O transfer operation is in progress within the data link processor subsystem.

The ability to reconnect to a host system requires the data link processor to contain a "linking mechanism" to re-establish the communication path between the peripheral device and the host system that initiated that peripheral device. The logic circuit that provides for this reconnection is contained in the data link processor. Alternatively the logic circit that provides for this connection and reconnection may be contained in a system controller (SC) or a unit such as the IOT (input/output translator unit, described in the aforementioned U.S. Patents). Every peripheral device that is connected to the DLP I/O subsystem uses one of this type of "connection-reconnection" control devices.

The message level interface that connects the host system to a DLP I/O subsystem is capable of conducting all communication between the host system and the peripheral subsystem including connection, reconnection and disconnection.

Two types of communications are made use of between the host system and the I/O subsystem. These are (a) "control" communications done by control levels and (b) "data transferring" communications. In both types of communication information (either control levels or data) pass between the host system and the peripheral subsystem.

When information passes from the main host system to the DLP I/O subsystem, the operation is described as a "Write" operation. When information is passed from the I/O subsystem to the main host system, the operation is described as a "Read" operation. For example, when a peripheral device requests to be reconnected to the main host system or to another available main host system, the communication starts in the I/O subsystem with information passed on to the host system and is, therefore, a "Read" type of operation. When a host system initiates a peripheral device and the communication starts from the host system with information being passed from the host system to the peripheral, this is called a "Write" type of operation.

Those peripheral devices of the "input" type will produce only "Read" data for the host system. Those peripheral devices of the "output" type will only receive data from the host system, i.e., a "Write data" operation. Thus, input or output peripheral units require either a "Read data" or a "Write data" operation. Read data and Write data are not the same thing as "read or write" operations because "read or write" only describes the direction of the flow of information on the message level interface. A read function performed by an input peripheral device requires a "Write" operation to initiate the peripheral device first, followed by a "Read" operation to pass the data to the host system.

As described in U.S. Pat. No. 4,074,352, the LCP base module is the basic building block for an input-output subsystem. In the case where a universally "Common Front End" card is used in each data link processor (DLP), the subsystem can be designated as the "Common I/O Subsystem". The DLP base module consists of a backplane which connects slide-in cards, any two of which form a DLP. A base module consists of one to six Distribution Cards (DC) for communication to/from the system and houses from one to eight data link processors (DLP's), each of which handles data communications to/from a specific peripheral terminal unit. Each base module also includes one Maintenance Card (MC), two termination boards and space for additional cards for specialized purposes, but which are not essential to a normal operating situation.

Each data link processor (DLP) consists of a Common Front End card (CFE) and peripheral dependent logic which is located on separate circuit board known as the Peripheral Dependent Board (PDB). Read only memories designated as PROMs located on the Common Front End card contain micro-code words wich are the only elements dependent on the type of peripheral device used, the remaining of the elements being standard independent components. The Common Front End card and the Peripheral Dependent Board communicate to each other via three 50-pin frontplane connectors seen in FIG. 3.

The data link processor ($20_{03}$, FIG. 1) contains the hardware and power required to interface the host dependent port $10_p$ of the main host system 10 with a plurality of peripheral devices 53. The hardware of the subsystem consists of a base module as $20_0$, FIG. 2, which include the following:

1. a control console ($50_c$, FIG. 2)
2. the message level interface cabling (MLI), $15_i$.
3. the base backplane $20_{0B}$ for the data link processors, FIG. 3.
4. the base modules which fit into the cabinet and connect to the base backplane.
5. the data link processors (DLP) which are typically organized such that 8 data link processors are supported by each of the base modules (FIG. 2).

As described in the heretofore mentioned patents, the base modules are fitted with one or more Distribution Cards (DC) depending on the number of host systems which could be connected to that base module, plus a termination card and a Maintenance Card (MC).

As described in the afore-cited patents, the "poll test" is defined as the procedure used by a host system and its host dependent port to establish communication with a DLP subsystem. The host system initiates a connection to a data link processor by performing a "poll test" sequence. The result of this sequence is as follows:

1. a connection is made from the host system to the data link processor that also includes the status condition of the addressed data link processor.
2. a signal indication that a particular data link processor is "not active" in that particular DLP address, that is, the DLP is not physically present, or it has been taken off-line by the Maintenance Card, or it is unavailable because of a PROM parity error.
3. a signal indication that another Distribution Card (DC) is actively engaged in the particular base module and thus a path to the requested DLP is not available at this time.
4. a signal indication that the address requested did not carry the proper parity.

To begin a "poll test", the host system 10 sends a Channel Select to the particular base module that it has selected to be connected. The Channel Select signal provides an indication to the Distribution Card (DC) that it has been selected for a poll test. The host system sends the address of the DLP on data lines D-8 (MSB, most significant bit) through D-1 (LSB, least significant bit).

A LEM (line expansion module) card can be connected to a base module to enable 16 DLPs to be connected to a single MLI $15_i$. A BCC (base control card) can be used to provide identity signals for a base module.

If a line expansion module (LEM) is in use, the host system sends the Distribution Card the address of the requested base module on data lines C-8 (MSB) through C-1 (LSB). If a base control card (BCC) is to be addressed, then bit A-8 is used. The host dependent port (HDP) then sends Address Select to all of its base modules. This causes the Distribution Cards that receive the Channel Select to begin a poll test, and signifies to all other Distribution Cards that the host system interface is busy. This busy indication is needed by non-connected Distribution Cards to resolve Distribution Card priority in handling DLP requests for connection in situations where there is a multiple Distribution Card base environment.

The Distribution Card (DC), which is selected by the Channel Select and the Address Select signal, acknowledges by returning a DLP strobe signal back to the host system 10. If another Distribution Card is actively engaged on the base module backplane, or a Distribution Card of higher priority is also taking a poll test connection, then a "port busy" indication accompanies the acknowledge signal. If the vertical parity carried on the address is incorrect, a parity error indication accompanies the acknowledged signal. If the base module is available for connection and the address parity is correct, then the host system receives only the acknowledge signal. The Distribution Card addresses and connects to the addressed DLP.

The Distribution Card connects with the selected DLP by decoding the DLP address and driving one of eight address lines. The DLP specified by the address line has the address receiver jumpered to the correct address line. The DLP receiving this address sends a DLP connected signal (LCPCON) back to the host system to indicate its presence.

Upon receiving an "acknowledge" signal, and no indication of a port busy or parity error signal, the host system drops its Channel Select signal. This makes all lines available for connected communication. However, if an exception condition is reported, the host system must disconnect from the DLP.

When the Distribution Card detects the absence of a Channel Select, it sends another acknowledge (strobe signal) If the DLP addressed, has responded with LCPCON, the Distribution Card "enables" the DLP's status signal to the host system with this second "acknowledge". With the second acknowledge, the DLP and host system are connected via the Distribution Card. If the selected DLP did not respond (because it was off-line or not installed) the host system receives (together with the acknowledge signal) a DLP status signal of "zero" indicating that the DLP is not available.

If the DLP is unable to handle a poll test at this time (because it is busy) the DLP status indicates this condition. It is the function of the host system to detect and to respond to this condition by "disconnecting" or converting to a poll request. The connection established with this "poll test" remains intact as long as "address select" remains true.

The DLP participation in the poll test-host system connection routine is minimal. The DLP only receives its unique address line and returns LCPCON in acknowledgement and enables the status line. If there are multiple Distribution Cards installed in a base module, then access to the backplane of the base module is achieved by a request granted mechanism in the path selection module (PSM). The PSM also provides for Distribution Card priority resolution.

POLL TEST TO POLL REQUEST CONVERSION

If the host system 10 is performing a poll test, and the initial DLP status indicates that the DLP desires access to the host system for information exchange because of a previous I/O descriptor, the host system has three options:

(a) disconnect
(b) selectively clear a DLP
(c) handle and service the DLP

If the option (c) is selected, the host system converts to a "poll request". A "poll request" is defined as the procedure used by a data link processor to establish communication with a host system. A "poll request" is the opposite of a "poll test" because the origination of the communication is reversed, that is, with the DLP being the transmitter and the host system being the receiver and responder.

In conjunction with any initial status in the "read" direction (information flow toward the host system) the Distribution Card sends the DLP data toward the host system. If the initial status is "Send descriptor link", this data is the first word of the descriptor link and contains the host return field. The host system must check this field to be certain that it can handle the DLP information transfer. If the host system cannot handle it, the DLP must "disconnect" before sending any host system strobes.

DLP INITIATED CONNECTION (POLL REQUEST)

When access is required to the host system and a disconnection has occurred, the DLP re-establishes connection by initiating a "poll request" sequence. Because all DLP's may request connection at the same time, a decision is made on a priority basis. Priority is partitioned into two types—(a) global priority, and (b) base module priority. The global priority of a DLP is based on the type of peripheral device which it services. There are 6 standard levels of global priority for DLPs. The global priority of a particular DLP is assigned with regard to the host system access requirements of the peripheral device, such as speed, stream mode, etc.

An additional and higher level of global priority is provided to designate an emergency request. This is designated as global priority equal to 7. An emergency request is defined as a condition requiring immediate access to the host system in order to avoid difficulty in error recovery or operator action. Global priority is used by the main host system to determine the priority of each requesting Distribution Card. Base module priority is the priority of each DLP within the base. Base module priority is used by the Distribution Card to determine the priority of each requesting DLP.

Base module priority is determined by the DLP number of each DLP in the base module. This number corresponds to the DLP address jumpered on each DLP, for example, the DLP address 7 is equal to DLP number 7 which is equal to the base module priority equal to 7. The established priority levels are arranged such that the highest base module priority is 7 while the lowest is 0. Only one DLP within each base module is assigned to, each priority number. Thus, a base module has been organized to contain a maximum of up to 8 DLPs.

To begin a poll request, the DLP raises the "request" level jumpered to one of eight DLP request lines in the DLP, depending upon and equal to tha address of the DLP. Upon detecting a DLP request, if the host system is idle, the Distribution Card raises an interrupt request to the host system. When the host system detects "Interrupt Request" it sends "Access Granted" to all the base modules and begins a poll request sequence. Access Granted allows all Distribution Cards that have requests on-line to begin poll requesting. Access Granted also signifies that the message level interface (MLI) is busy to all Distribution Cards that are not reqeusting.

CONNECTED STATE

In the connected state, the Distribution Card (DC) provides the communication path between the host system and the selected data line processor. All communication between the host system and the base module is asynchronous. This requires that send/acknowledge on the message level interface be pulses rather than levels. The host system send/acknowledge (AG+SIO) and the DLP send/acknowledge (LCPST/) are pulses on the message level interface (MLI).

The base module of the I/O subsystem can support up to eight data link processors which are mounted on slide-in cards which connect to the backplane of the base module. In each base module facilities are provided for slide-in cards which can be installed and which work with the data link processors and the main host system. These cards may be summarized as follows:

Distribution Card (DC):

The Distribution Card provides an electrical and functional interface between a given DLP base module and a host system. The circuitry of this card provides host system connection for 1-8 data link processors (DLPs). The routines for establishing a connection between a given DLP and the host system are implemented by logic circuitry contained on the Distribution Card. A connection can be initiated by either the host system or by a data link processor. When the host system initiates the connections, this is designated as "poll test"; when the data link processor initiates connections, these are designated as "poll requests".

All communications between a host system and a base module are asynchronous. The Distribution Card synchronizes this communication. The Distribution Card provides for the capabilities of up to 6 transfer paths into a base module from one or more host systems. Each separate path into a base module requires a separate Distribution Card, if a multiple configuration is used, then a card known as the PSM or path selection module is required. Once a Distribution Card has provided a connection between the host system and a selected data link processor, the Distribution Card assumes a "connected" state and then becomes practically transparent to communication transfers between the host system and the selected data link processor.

PATH SELECTION MODULE (PSM)

The path selection module is a card inserted into the base module and is required when the base module contains two or more Distribution Cards. The path selection module governs access to the base backplane, and it selects and routes the DLP request, in addition to also handling Master Clear of all base modules and in addition to Selective Clear of selected base modules.

BCML/TTL CONVERTER (BURROUGHS CURRENT MODE LOGIC /TRANSISTOR TYPE LOGIC) CONVERTER

This optional converter card is used to interface a main system host dependent port (HDP) that is using Burroughs current mode logic architecture with the standard transistor type logic format of the data link processor subsystem.

TERMINATION CARDS

Each DLP base standardly requires two termination cards (TC). These cards are designated as numbers 1 and 2 and contain the required transistors and capacitors in order to properly balance and load the base module backplane lines.

MAINTENANCE CARD

Since a single backplane is provided in common for all of the data link processors of a given base module, this permits a large proportion of the DLP maintenance to be centralized. This centralized maintenance circuitry is located on the Maintenance Card that is installed at one end of the DLP base module (opposite from the position of the Distribution Card). The Maintenance Card contains the clock generation circuitry for the entire base module, in addition to other maintenance circuitry, such as circuitry for diagnostic procedures. These diagnostic procedures include the ability to simulate the peripheral interface, to control the clock to the data link processor, and to access the storage elements of the data link processor for comparison with standardly expected results.

As stated, the clock generation logic circuitry of the entire base module is located on the Maintenance Card. Since every card in a given base module receives this signal, the actual signal distribution has been divided into two lines in order to halve the driver requirements. The actual clock is an 8-megahertz, 50% duty cycle positive pulse on the DLP backplane.

DATA LINK PROCESSOR (DLP)

A data link processor provides the control logic and the host system interface function for the associated peripheral units which it services. The DLP logic that controls the peripheral device is device-dependent; therefore, some DLPs contain different hardware and-/or different micro-codes. Communication with the main host system is via the message level interface by way of the Distribution Card. Requests for host system access originate from a data link processor. The DLP disconnects from the host system while transferring information to or from the peripheral device it services. A DLP consists of two or more cards (generally 10 by 13 inches each). Each card can contain a maximum of 96 TTL chips arranged in a 6×16 array. The cards plug into adjoining slots in the base module backplane. A data link processor is made up of a Common Front End card (CFE) and one or more Peripheral Dependent Boards (PDB). The CFE and first PDB are connected together by three foreplane connectors, containing 50-pins each (FIG. 3). If more than one PDB is required for a CFE, then the PDB cards are connected to each other by a fourth 50-pin foreplane connector. The CFE card contains the necessary logic to store and execute the micro-code that is dictated by the particular Peripheral Dependent Board being used. Random access memory (RAM) chips and programmable read-only memory (PROM) chips are located on the Common Front End card. The unique logic required by a particular peripheral device is located on the PDB 80 and can vary according to the particular type of peripheral device being serviced. On the other hand, the CFE $10_c$ is a standardized card which provides functions common to all types of Peripheral Dependent Boards and peripheral devices serviced.

The function of the DLP is to interface a particular peripheral device to the main host system. The required communication between the host system and the DLP is standardized in method and content. Every DLP communicates to the main host system using this standard discipline. The DLP masks the peripheral idiosyncrasies from the host system. Thus, the DLP is independent of the host system because of this. The data link processor performs its peripheral-controlling functions in response to information received over its interface to the host system.

Data link processor communication with the host system is accomplished by use of standard DLP "status" states. These status states indicate to the host system the requirements of the DLP (at any given unit of time). Once a connection is established between a data link processor and a host system, all information transfers are performed as indicated by the DLP "status" signal. Thus, the entire communication process is oriented about the DLP and is "DLP status driven". The "status state signals" are common for every type of data link processor. This has been described in detail in U.S. Pat. No. 4,162,520.

Every data link processor contains a message buffer of a size sufficiently applicable to its associated type of peripheral device. Data transmissions between the DLP and the host system operate to and from this message buffer. This eliminates access errors for peripherals having fixed record lengths such as card readers, printers or card punches. Stream mode devices such as tapes and disks contain and utilize two or more buffers to accomplish variable length message transfers.

DLP STATUS FLOW SIGNALS

The DLP status flow is designed to allow orderly message transfers. When it is said that the host system is "DLP status driven", this means that the DLP indicates its requirements to the host system by sending its status state signal. These status states are transmitted continuously by the DLP once it is connected to the host system. The host system examines these status lines at DLP "send/acknowledge" time. Every DLP implements this common signal flow in a manner designed to provide as much commonality as possible so that each DLP will have a standardized routine. Status states are generated for host system usage only; they are not used logically by the DLP. They are used to make the host system aware of the internal operation routine of the DLP. Thus, this allows the host system to anticipate somewhat the requirements of the DLP.

STATUS STATE SIGNALS FOR THE DATA LINK PROCESSOR

As was previously described in U.S. Pat. No. 4,162,520 on column 70 and in connection with FIG. 6A and Table VII, each condition or situation of the operating routine of the DLP will have a Mnemonic and a "status state count number". In the present system which uses the data link processor and a host dependent port, HDP, rather than the input/output translator (IOT) of the above mentioned patent, the following Table O-SS outlines the description of each of the status states of the data link processor. It will be seen that each of the states follow the same routine pattern of that shown for the earlier line control processors.

TABLE O-SS

| Status Mnemonic | Status State Count | Usage or Meaning |
| --- | --- | --- |
| Cleared | STC = 0 | Entered by the DLP when it is cleared. This status is also shown if the DLP is not present, it has a PROM parity error, or it has been taken off-line by the Maintenance Card. |
| Disconnect | STC = 1 | Used by the DLP to indicate that no more transfers are possible during the connection, or to indicate that the DLP is unable to accept a new I/O descriptor. |
| Reserved | STC = 2 | Reserved for expansion. Detection of this status results in an error. |
| Idle | STC = 3 | Indicates that the DLP can accept a new I/O descriptor, or that a DLP receiving this new descriptor requires additional descriptor words. |
| Read | STC = 4 | Indicates that data is being transferred to the host system by the DLP. |
| Send Descriptor Link | STC = 5 | Indicates that the descriptor link is being sent, to the host system. |

TABLE O-SS-continued

| Status Mnemonic | Status State Count | Usage or Meaning |
| --- | --- | --- |
| Receive Descriptor Link | STC = 6 | Indicates that the DLP needs to receive, or is receiving the descriptor link. |
| Result Descriptor | STC = 7 | Indicates that the result descriptor is being sent to the host system. |
| Write | STC = 8 | Indicates that the DLP needs data from the host system. |
| Encoded Status | STC = 9 | Indicates that the DLP is sending special status information on the data lines. |
| Port Busy | STC = 10 | The host is waiting on port busy, but the LEM has a request from another DLP. |
| I/O Descriptor LPW | STC = 11 | Indicates that the DLP requires the I/O descriptor LPW. |
| Break | STC = 12 | Indicates the end of a data message, and the DLP now wants an LPW. |
| Break Enable | STC = 13 | Indicates the desire by the DLP to transmit another message to the host system. The host system may accept or refuse this request. |
| Character Transfer | STC = 14 | Used by certain DLPs to resolve the contents of the last data word that has been received from the host system. |
| Result Descriptor LPW | STC = 15 | Indicates that the final word of the result descriptor is being sent to the host system and is followed by the appropriate LPW |

INFORMATION TRANSFERS

All information transfers between the DLP I/O subsystem and the host system are asynchronous and accomplished by means of control strobes. On the other hand, transfers between Distribution Card on the DLP are synchronous. The various types of information transfers are briefly described hereinunder.

SYSTEM TRANSMIT

When information is ready to be sent to the I/O subsystem, the host system emits a pulse (SIO) to the DLP I/O subsystem. When the subsystem has received data it then emits a pulse (LCPST) over to the host system. At this point the next transfer takes place beginning with a SIO signal. Resynchronizing of the asynchronous signals occurs in the Distribution Card (DC). Upon receipt of the host system strobe, the Distribution Card synchronously sets the STIOL level to the DLP. STIOL is synchronously reset when LCPSTL is "true" from the DLP. The answer to the host system occurs as soon as LCPSTL is "true" from the DLP. If this is the case, STIOL is "true" for only one clock period and the host system strobes are immediately answered. Data from this system is latched in the Distribution Card on the trailing edge of the host system strobe.

SYSTEM RECEIVE

When the host system can accept another word of data from the DLP I/O subsystem, it emits a pulse (SIO) to the subsystem. In turn, when the subsystem is capable of sending a new word it emits a pulse (LCPSTL) to the host system. Upon receipt of the host system strobe, the Distribution Card synchronously sets the STIOL "level" to indicate that a new cycle can begin. The new cycle is completed and the host system is strobed when LCPSTL is "true" and STIOL is synchronously reset. LCPSTL can be "true" before the SIO is received. If this is the case, STIOL is "true" for only one clock period and the host system's strobe pulses are immediately followed by subsystem strobe pulses with new data. Data to the host system is latched in the Distribution Card on the leading edge on the subsystem strobe pulse to the host system.

LINE TURN

In the course of a message transfer, it is sometimes necessary to change the information direction. The host system and the DLP coordinate in this turnaround of bi-directional lines. The DLP controls the data direction in the base module with a backplane line called I/O send (IOSND/). I/O send, when low, directs the data lines toward flow into the host system. The DLP initiates the "line turn" with a status transition that requires a change in information direction. Two situations occur here:

1. Host System Transmit to Host System Receive: If the host system detects a status change when it receives an acknowledge (on the information transfer that requires it to receive information) the host system sends another strobe to acknowledge the "status change". The DLP detecting the host systems "acknowledge" raises the I/O send and begins transmission to the host system.
2. Host System Receive to Host System Transmit: If the host system acknowledges an information transfer in conjunction with a status change that requires a line turnaround, the DLP inactivates the I/O send and sends another DLP strobe to the host system. When the host system receives the "acknowledge" (that the base lines have been turned), then the host system begins to transmit to the DLP.

DLP BASE ADDRESS

As the DLP base backplane is made up of common lines running the length of the base, the printed circuit cards, which form the DLP, can function in almost any set of slide-in card locations. The base address chosen for a DLP is "jumpered" on the DLP card (FIG. 3). The base address serves only to make the DLP unique within the base. The DLP's global priority is not affected by its base address. This priority is selected on the Distribution Card (DC).

There are two backplane line functions that are linear: the DLP request and the DLP address. They are allocated eight lines each (0–7). The request and address jumpers must correspond.

DLP ID (IDENTIFICATION)

Upon receiving a TEST/ID OP code, the DLP returns a two-word result descriptor (R/D). The second word contains DLP ID information. Digits A and B of the ID word are a predetermined bit pattern specifying the type of DLP. Digits C and D of the ID word are a bit pattern specified by field-installed jumpers, and are used to uniquely identify the DLP. The ID word for the DLP is formatted as follows:

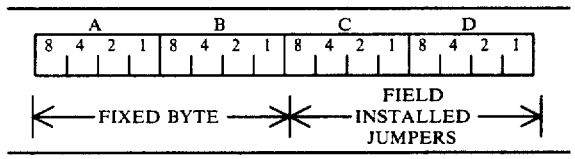

I/O DESCRIPTORS

The I/O descriptor is transmitted in 17 parallel bits including odd parity. The DLP OP codes are limited to the following four types:
1. Read
2. Write
3. Test
4. Echo Operations that do not transfer data are considered "test". Thus, a test is defined as an operation that results in the host system receiving a result descriptor only. Echo is a maintenance operation that causes the DLP to accept a buffer load of data from the host system, and then return it back to the host system. This allows a quick confidence check of the I/O data path as far as the DLP buffer is concerned. Also, the various translation logics can be checked by an echo operation.

DLPs that require further information associated with the basic operations obtain that information in the form of variants. The first I/O descriptor transfer contains the four OP code bits and up to 12 variant code bits. Further variants are transferred in 16 parallel bit increments and are not limited to any size.

RESULT DESCRIPTORS

A result descriptor is transmitted to the host system along 17 parallel bits including odd parity. The first four bits (one digit) of the first word of the DLP result descriptor are common for every DLP. These first four bits are shown as follows:

| Bit | - | Significance |
|-----|---|--------------|
| A8  | - | Not ready peripheral |
| A4  | - | I/O Descriptor error |
| A2  | - | MLI Vertical parity error |
| A1  | - | MLI longitudinal parity error |

The B, C and D digits of the "DLP result descriptor" will vary according to the type of data link processor involved.

FIG. 4A shows a block diagram of the Common Front-End, $10_c$, (which is sometimes designated as a "Common I/O" unit). The maintenance control bus 30, coming from the Maintenance Card $20_{om}$ provides input to a receiver 15 which has one output to the address multiplexor 12 and another output on bus 37 to the peripheral dependent board (PDB) 80.

The Distribution Card data bus 32 provides input to receiver 16 while line 31 provides another input (RCV/) to receiver 16 from the peripheral dependent board 80. One output of receiver 16 is fed to the address multiplexor 12; while the other output forms bus 36 as a data bus to the PDB 80.

Receiver 17 has one input from the Maintenance Card data bus 34 and another control, SIMRCV/ (simulate receive) input line 33 from the peripheral dependent board PDB 80. Receiver 17 provides an output to the address multiplexor 12 and an output to the data bus 38.

Bus 35 from PDB 80 provides another input to the address multiplexor 12, while the low order address bit (AO) from the PDB 80 on line 36 provides an input to the PROM 13. PROM 13 provides a bus to the PROM register 14, which register also has an input from AND gate 24 which has two inputs; one of which constitutes the PROMCLK/ line and the other input is from the parity check circuit 18 to signal whether or not a parity error has been detected.

PROM register 14 has an output on bus 40 for maintenance display signals and connects to the common backplane of the base module. Another output of the PROM register 14 connects to the Request Status Latches circuit 19 which feeds its output to drivers 20 to provide signals designated IOSF (I/O Send flip-flop) Status, REQ (request) and EMREQ (emergency request) which are interrupts to the host. This bus also connects to the common backplane.

The PROM register 14 outputs include: the control lines of bus 43, the PDB usage bus 44 and the multiplexor enable bus 45, all of which connect to the peripheral dependent board, PDB 80.

A Random Access Memory or RAM buffer storage 22 will be seen having four sets of inputs from the peripheral dependent board 80. These inputs are: the chip select line 50, the write enable line 51, the RAM data in-bus 52 and the RAM address bus 53. The output bus of RAM 22 is designated as the RAM data-out bus which connects to the peripheral dependent board 80.

COMMON FRONT END-CARD (CFE)

Referring to FIG. 4A which shows a block diagram of the Common Front-End (CFE) $10_c$, the central operative element of the Common Front-End is the PROM controller and storage unit 13. The PROM storage 13 consists of 13 separate PROM chips which may have a total storage capacity of 1024 52-bit words. This includes odd parity.

As seen in FIG. 4A the common front-end also contains the receivers 15, 16, and 17, for the data link processor (DLP) interfaces with the distribution card on data bus 32 and the maintenance card on control bus 30. The "enable" signals for these buses are driven by the peripheral dependent board 80.

The data link processor RAM storage buffer 22 has a capacity of 1024 17-bit words which includes odd parity. The RAM storage unit 22 is controlled entirely by the peripheral dependent board 80 (FIG. 5B). The following Table I lists a glossary of various signals and terms used in the Common Front-end.

TABLE IA

| COMMON FRONT-END CARD: GLOSSARY OF TERMS | |
|---|---|
| AO | BROP |

TABLE IA-continued
COMMON FRONT-END CARD: GLOSSARY OF TERMS

| | |
|---|---|
| PROM address bit 0. | When high, a 16-way PROM address branch is selected. |
| A1 | BRST |
| PROM address bit 1. | When high, use stack register for PROM address. |
| A2 | BUFFEND/ |
| PROM address bit 2. | Active low, from PDB, used to stop burst mode. |
| A3 | CLK8 |
| PROM address bit 3. | 8-megahertz clock. |
| A4 | CLK8/ |
| PROM address bit 4. | 8-megahertz clock not. |
| A5 | CLKEN |
| PROM address bit 5. | High active, clock conditioning level. |
| A6 | CLKEN/ |
| PROM address bit 6. | Low active, used to enable clock on PBD and CFE. |
| A7 | CLKST |
| PROM address bit 7. | When high, PROM clock is disabled. |
| A8 | CLOCK..0 |
| PROM address bit 8. | 8-megahertz backplane clock from MC. |
| A9 | CLOCK/ |
| PROM address bit 9. | CFE control logic clock. |
| ADLOC/ | |
| When high, DLP is MC addressed or DLP address is not valid | CLR/ Active low, logic clear term. |
| ADRVLD/0 | CLRD |
| When low, LOCnn/.0 is valid | Active high, logic control term. |
| AF | CLRLAT |
| When high, strobe I/O has been received. | Active high, logic term used to control SCLR. |
| AF/ | CONECT/ |
| When low, strobe I/O is sent to the PDB. | Active low, DC is connected to DLP. |
| BASCL/0 | CS/ |
| When low, the base is in local. | Active low, RAM-chip-selected level. |
| BR6 | |
| A branch line from PDB for PROM address selection. | DATAA8/0 - DATAPR/0 17-bit data bus from DC. |
| DBUSA& - PARITY/0 | LCLCLR/0 |
| 17-bit data bus. | Active low, clear level from MC. |
| DBUSn | LCPAD |
| 9-bit bus used as input to PROM address MPXs. | Active high, DLP is addressed by DC or MC. |
| DIOSND/0 | LCPAD/ |
| Active low, I/O SEND level to MC. | Active low, DLP is addressed by DC or MC. |
| DLCPST/0 | LCPADF |
| Active low, DLP strobe to MC. | Active high, DLP is addressed by DC or MC. |
| DPLY01/0 - DPLY10/0 | LCPCON/0 |
| Ten display lines to MC. | Active low, DLP is connected to DC. |
| DSEL1/ - DSEL4/ | LCPRQn/0 |
| Multiplexor address lines for data selection to display lines. | Active low, DLP request levels to DC. |
| | LCPSTL Active high, DLP strobe level. |
| DSEL8/ | |
| Active low, multiplexor chip select line for input to display lines. | LCPSTL/0 Active low, DLP strobe level to DC. |
| DSIMA8/0 - PARSIM/0 | LCSTU1/0 - LCSTU8/0 |
| 17-bit data bus from MC. | Four DLP status lines DC. |
| DSIMn | LOCAL/ |
| 9 bits to DSIM lines, used to become DBUSn. | Active high, DLP is not MC addressed, or address is not valid |
| DSTAT1/0 - DSTAT8/0 | |
| Four DLP status lines to MC. | |
| EMREQ | LOCAL/.1 |
| Active high, DLP emergency request. | Active low, DLP is MC addressed. |
| EMRREQ/0 | LOCnn/.0 |
| Active low, DLP emergency request to DC. | Local address lines from MC. |
| GPRIF/ | MLCPAD/0 |
| Peripheral bus control term to PDB. | Active low, DLP is addressed by MC. |
| GPRIF/.0 | MSTCLR/0 |
| Active low, from MC, disconnects PDB peripheral cable. | Active low, base power-up clear from MC. |
| GRP0/ | MSTIOL/0 |
| Active low, controls 16-line display to MC. | Active low, maintenance strobe I/O from MC. |
| INRAMA8 - INRAMPR | MTERM/.0 |
| 17 RAM input data lines. | Active low, maintenance terminate from MC. |
| IOSF | OFFLN |
| I/O SEND flip-flop to PDB. | Active high, MC has localized the CFE. |
| IOSND/.0 | OFFLN/ |
| I/O SEND to DC. | Active low, the DLP is in local. |
| #BRANCH1 - #BRANCH5 | #LDSTK/ |
| PROM branching control lines. | Active low, allows stack register load of current PROM address. This level is held high during all microcode subroutines. |

TABLE IA-continued
COMMON FRONT-END CARD: GLOSSARY OF TERMS

CONST0 - #CONST7
Multipurpose PROM outputs, PDB-dependent.
G3 - #L4
PDB dependent PROM outputs (see PDB GLOSSARY OF TERMS).
LCPTSTL/
Active low, DLP strobe level, from PROM controller, to DC.
LDINT/
Active low, (load interface) PROM ML1 bus control level.

NEXT0 - #NEXT8
PROM address bits.

PARITY
PROM parity bit (odd).

+5V
VCC from power supply.

TABLE IB
GLOSSARY OF TERMS - PERIPHERAL DEPENDENT BOARD

ABANDON
If set, this signal allows an operation to the MEC to complete without further microcode control. The result of the operation is discarded.
ADDCLR/
Address clear. When low, clears the SAD and PAD counters to zero.
ADDEQ
Address equal. When high, indicates equality of the SAD and PAD counts.

ADDSLA
Address select A. Used in combination with #ADDSLB to select one of three addresses: SAD, PAD, or QAD.
ADDSLB
Address select B. See #ADDSLA.

AF
Asynchronous flip-flop. Follows the STIOL by one cycle.

BRANCHn
Used to select the various signals for PROM address bit A0.

BUFDONE/
Buffer limit. When low, indicates end-of-buffer count in PAD.

BUFLIM/
Buffer limit. When low, indicates end-of-buffer count in SAD.

BUFSEL
Buffer select. The most significant digit for both PAD and SAD, determines which half of the RAM is used for data storage.
BUSY
Comes from the MEC and indicates the MEC is ready for data transfer. BUSY goes low after the result has been sent by the MEC.
CLEAR
Comes from the CFE and includes local clear, etc. Clears the MEC interface, stopping any operation in progress.
GPRIF
Gated peripheral. Used in peripheral simulation. When driven high, causes the MEC-related signals to be diverted to the Maintenance Card control.

IDnn
Identification jumpers select. Selects the ID jumpers for reading. Also used to stop burst mode under microcode control.

IGNORE
If set, allows the DLP to ignore data coming from the host system while handling data from the MEC.

INFOnn
MEC information lines. Consist of 17 bidirectional lines which are used to transfer information to and CLK8
The enabled 8-megahertz DLP clock.

CLR + PER
Clear or PROM parity error. Clears the MEC interface.
CS/
Chip select. When low, this signal enables the RAM for reading and writing functions.
CONSTn
Constant lines 0-7. Originate in the microcode and are used to determine the values to be driven when loading the MEC interface register; they also choose the function to be performed by the shift register and are used for certain QAD bits.
CONNECT
When high, this signal indicates a connected condition with the host system.

DATAV
Data available. When high, indicates a clock from the MEC has been detected.

DATAVK
Data available reset. Used to clear the DATAV flag.

FLAGA
When high, indicates a non-BCD digit is in the A or B positions of the data bus (also see OPDEC).

FLAGB
Not used by the PEMT-DLP.

FLAGC
Not used by the PEMT-DLP.
FLGCLR/
Flag clear. Originates in the microcode and when low, clears the MLIPAR, LPWERR, and PERVPAR flags.
FSLn
Function select bits. Originate in the microcode and are decoded into seven active functions and a null state.
MUXSLA
Multiplexor select A. This signal is used in combination with MUXSLB to select the RAM, the shift register, the receive register, or the LPW register to drive the INRAM bus.
MUXSLB
Multiplexor select B. See MUXSLA.

NVP
New vertical parity. This signal is generated to insure odd parity on the INRAM bus.

OPDEC
Operaton decode. Reflects the decoded output of the present operation as presented by the output of the 16-way operation decode microcode branch.

ODDAB

TABLE IB-continued
GLOSSARY OF TERMS - PERIPHERAL DEPENDENT BOARD from the MEC.

INRAM
A major data bus that can be driven by the RAM. the shift register, the receive register, or the LPW register.
IOSF
I/O SEND flip-flop. When IOSF is set (high) the PEMT-DLP is driving the MLI. When reset (low) the DLP can receive MLI information.

LPnn
Individual LPW outputs from the LPW register.
LPWCLK
LPW clock. Causes the outputs of the LPW ter and the system register to be exclusive ORed into the LPW register.

LPWPRE
LPW preset. Causes all ones to be fed to the LPW register in the presetting function. It also clocks the LPW error flip-flop.

LPWERR
LPW error flip-flop. Accumulates the detected LPW errors on the data received from the host system.
increment will cause the PAD to go to zero.
LOCAL
When high, this signal indicates that the Maintenance Card has access to the PEMT-DLP.
PADLD
Peripheral address load. Causes the lower 8 bits of PAD to be loaded from the C and D digits of the INRAM bus.
PADn
Individual (n) peripheral address bits.
PARERR
Parity error. When high, indicates a mismatch between INRAMPR and the NVP calculated for the word on the INRAM bus.

PERF
PROM Parity error flip-flop. When high, indicates an error has been detected on the PROM output register, stopping the DLP clock.

PERVPAR
Peripheral vertical parity error flag. When high, indicates a vertical parity error was detected on information received from the MEC.

PINTCLR
Peripheral interface clear. Deactivates all signals from the DLP to the MEC.

PINTLD
Peripheral interface load. Loads the control signal to the MEC.

PRCV
Peripheral receive. Enables the tristate receivers to feed the INFO bus into the receive register.

PSHDN
Push down. Causes a one to be pushed out of the poll register.

PSHUP
Push up. Causes a one to be pushed into the poll register.

P1
Poll flag one. Used for buffer management to indicate that at least one buffer is ready for host system access.
P3
Poll flag three. Indicates that at least three buffers are ready, and the hardware must consider raising emergency request.

Indicates that an odd number of ones exist in the A and B digits of the INRAM bus.

ODDCD
Indicates that an odd number of ones exist in the C and D digits of the INRAM bus.
OFFLN
Off-line. When high, prevents the DLP from communicating with the host system.

OPEND
End of operation. Causes SELECT to be dropped to allow the result to be transferred and discarded.
PADCLR increment Peripheral address clear. Drives the PAD to all zeroes.

PADCTU
Peripheral address count up. Increments the PAD.

PADCTD
Peripheral address count down. Decrements the PAD.

PADEND
Peripheral address end. When high, indicates that the last count is currently in the PAD. The next PADENDF .
Peripheral address end flip-flop. Set by PADEND.
QADn
Individual queue address bits (n). Represents the tape drive unit number for assigning a queue to a magnetic tape unit.
QUECLR
Queue clear. Clears QAD to unit number zero.
Q1
MEC clock resynchronization.

Q2
MEC clock resynchronization.

Q3
MEC clock trailing edge detect.

RAMWE
RAM write enable. Causes the INRAM bus to be written into the RAM.

RCV
Receive enable. Allows the data bus to be input to the receive register.

RDYST
Ready status. Received from the MEC to indicate that the MEC is ready to receive an operation.

READY
Received from the MEC after it has taken the initiate word.

RECnn
Individual receive register bits.

SADBRW
System address register borrow. A flag to indicate that the four least significant bits of the SAD are zero. Also used when decrementing a decimal count.

SADCLR
SAD clear. Forces the SAD count to zero.

SADCTD
SAD count-down. Decrements the SAD.
SADCTU
SAD count-up. Increments the SAD.

SADCTU

TABLE IB-continued
GLOSSARY OF TERMS - PERIPHERAL DEPENDENT BOARD

P4
Poll flag four. Four buffers are ready, and the PEMT-DLP must consider a possible access error.

SADEND
When high, indicates that the SAD is at its highest count. The next up-count will result in a zero.

SADENDF
SAD end flip-flop. Stores the fact that the SADEND signal went high.

SADINCR
SAD increment. Causes SAD to count-up at each AF during read burst.

SADLD
SAD load. Causes the A and B digits of the INRAM bus to be loaded into the SAD.

SADn
Individual system address register bits.

SDnn
Individual system data register output bits.
SELECT
A signal from the DLP to the MEC to start an operation. Dropping SELECT solicits the result word from the MEC.

SEMREQ
Simultaneous emergency request. Indicates that an emergency request already exists in the base.

SEND
When high, indicates that a DLP is driving the INFO lines to the MEC.
SHDBIT
Shift-down bit. This bit is loaded into bit C8 of the shift register on shift-down operations.
SHFTOP
Shift operation. Generates the clock to the shift register.
SHFTCLK
Shift clock. Causes the selected shift function to be performed.
SYSVPAR
System vertical parity. Indicates that a vertical parity error was detected on information received from the host system.

TERMF
Terminate flip-flop. Indicates that the host system has raised the terminate line.

TERMBRST
Terminated burst. Indicates that the burst mode was stopped by a terminate from the host system.

WD
Shift word bits. From the shift register outputs.

SAD count-up (from microcode). Increments the SAD on its low-going edge, and when held high, allows the SAD to be automatically incremented by AF during burst mode.
SHFTCLR
Shift clear. Sets the shift register bits to all zeroes.

SIMRCV
Simulate receive. Enables the DSIM lines to feed the receive register.

SIMSND
Simulate send. Enables the system register to drive the DSIM lines.

SLA
When high, selects AF to clock the receive register, otherwise Q2 is used.

SLAF
Stores the fact that SLA was high.

SND
Send enable. Allows the system register to drive the data lines.
SPARE
Not used by the MT-DLP.

SPR-LCL
Not used by the MT-DLP.

SREGLD
System register load. The rising edge of this signal clocks the INRAM bus into the system data register. The trailing edge of this signal causes the LPW register to clock.
STOPB
Stop burst. When high, indicates that the DLP is not in burst mode.
STOPBF
Stop burst flip-flop. Records the fact that STOPB went high.
SW1
Switch one. Used during maintenance to load the address of the next microcode word.
XMIT
Transmit. Enables the transmit register to load and drive the INFO lines.

ZERO
Indicates that the word on the INRAM bus is all zeroes (the parity bit is not included).

ZEROAB
Indicates that the A and B digits of the INRAM bus are zero.

ZEROCD
Indicates that the C and D digits of the INRAM bus are zero.

DISTRIBUTION CARD INTERFACE

As previously indicated in FIG. 2, data link processors are housed in a base module unit. Each data link processor, consisting of two cards, slides into the base module housing having a common backplane to which the printed circuit boards of a data link processor are connected.

All communications between the Common Front End $10_c$ and the Distribution Cards such as $20_{od}$, $20_{id}$ are performed through the data link processor base module backplane. The backplane is common to all cards that are installed in a base module.

Table II shows a list of all the backplane signals that occur on the Distribution Card interface to the Common Front End. The 17-bit wide data portion of the bus 32, FIG. 4A, is received from the Distribution Card (DC) on the Common Front End (CFE). This same 17-bit bus is driven in the opposite direction (by drivers on the PDB) when the data link processor is sending data back to the Distribution Card. The enabling levels that control the direction of this bus are generated on the peripheral dependent board.

TABLE II

| | Distribution Card/CFE Interface | | |
|---|---|---|---|
| Level | Pin # | Direction | Definition |
| LCSTU8/0 | 123 | to DC | DLP status bit 8 |
| LCSTU4/0 | 023 | to DC | DLP status bit 4 |
| LCSTU2/0 | 126 | to DC | DLP status bit 2 |

TABLE II-continued

Distribution Card/CFE Interface

| Level | Pin # | Direction | Definition |
|---|---|---|---|
| LCSTU1/0 | 026 | to DC | DLP status bit 1 |
| LCPCON/0 | 074 | to DC | DLP is connected |
| IOSND/.0 | 124 | to DC | DLP is sending |
| EMRREQ/0 | 191 | to DC | DLP has emergency request |
| LCPRQ7/0 | 163 | to DC | DLP #7 has request |
| LCPRQ6/0 | 063 | to DC | DLP #6 has request |
| LCPRQ5/0 | 164 | to DC | DLP #5 has request |
| LCPRQ4/0 | 064 | to DC | DLP #4 has request |
| LCPRQ3/0 | 165 | to DC | DLP #3 has request |
| LCPRQ2/0 | 065 | to DC | DLP #2 has request |
| LCPRQ1/0 | 166 | to DC | DLP #1 has request |
| LCPRQ0/0 | 066 | to DC | DLP #0 has request |
| LCPSTL/0 | 024 | to DC | DLP strobe |
| STIOL/.0 | 127 | to CFE | Strobe I/O |
| TERM/. .0 | 072 | to CFE | Terminate |
| SELCLR/0 | 167 | to CFE | Selective clear |
| LCPAD7/0 | 176 | to CFE | DLP #7 is addressed |
| LCPAD6/0 | 076 | to CFE | DLP #6 is addressed |
| LCPAD5/0 | 177 | to CFE | DLP #5 is addressed |
| LCPAD4/0 | 077 | to CFE | DLP #4 is addressed |
| LCPAD3/0 | 178 | to CFE | DLP #3 is addressed |
| LCPAD2/0 | 078 | to CFE | DLP #2 is addressed |
| LCPAD1/0 | 179 | to CFE | DLP #1 is addressed |
| LCPAD0/0 | 079 | to CFE | DLP #0 is addressed |
| DATAA8/0 | 106 | Bi-Dir | Data bit |
| DATAA4/0 | 006 | Bi-Dir | Data bit |
| DATAA2/0 | 108 | Bi-Dir | Data bit |
| DATAA1/0 | 008 | Bi-Dir | Data bit |
| DATAB8/0 | 110 | Bi-Dir | Data bit |
| DATAB4/0 | 010 | Bi-Dir | Data bit |
| DATAB2/0 | 117 | Bi-Dir | Data bit |
| DATAB1/0 | 017 | Bi-Dir | Data bit |
| DATAC8/0 | 119 | Bi-Dir | Data bit |
| DATAC4/0 | 019 | Bi-Dir | Data bit |
| DATAC2/0 | 121 | Bi-Dir | Data bit |
| DATAC1/0 | 021 | Bi-Dir | Data bit |
| DATAD8/0 | 132 | Bi-Dir | Data bit |
| DATAD4/0 | 032 | Bi-Dir | Data bit |
| DATAD2/0 | 134 | Bi-Dir | Data bit |
| DATAD1/0 | 034 | Bi-Dir | Data bit |
| PARITY/0 | 136 | Bi-Dir | Data parity bit (odd) |

MAINTENANCE CARD INTERFACE

All communications between the Common Front End and the Maintenance Card (as 20$_{om}$) take place on the data link processor's base module backplane. Table III shows a list of all the backplane signals that occur between the Common Front End and the Maintenance Card.

TABLE III

Maintenance Card/CFE Interface

| Level | Pin # | Direction | Definition |
|---|---|---|---|
| DSTAT8/0 | 044 | to MC | DLP status bit 8 |
| DSTAT4/0 | 145 | to MC | DLP status bit 4 |
| DSTAT2/0 | 045 | to MC | DLP status bit 2 |
| DSTAT1/0 | 146 | to MC | DLP status bit 1 |
| DLCPST/0 | 140 | to MC | DLP strobe |
| DIOSND/0 | 144 | to MC | DLP is sending |
| MSTIOL/0 | 040 | to CFE | Strobe I/O |
| MTERM/.0 | 184 | to CFE | Terminate |
| MLCPAD/0 | 154 | to CFE | DLP is addressed |
| BASLCL/0 | 161 | to CFE | Base is in local |
| MSTCLR/0 | 172 | to CFE | Base clear |
| LCLCLR/0 | 174 | to CFE | Local clear |
| SWH.1/.0 | 0.58 | to CFE | Maintenance switch #1 |
| SP/. . . .0 | 147 | to CFE | Single-pulse mode |
| START/.0 | 149 | to CFE | Allow clock(s) |
| CLOCK. .0 | 048 | to CFE | 8 Mhz clock |
| ADRVLD/0 | 043 | to CFE | Local address is valid |
| LOC16/.0 | 187 | to CFE | Local address bit 16 |
| LOC08/.0 | 087 | to CFE | Local address bit 8 |
| LOC04/.0 | 188 | to CFE | Local address bit 4 |
| LOC02/.0 | 088 | to CFE | Local address bit 2 |
| LOC01/.0 | 189 | to CFE | Local address bit 1 |

TABLE III-continued

Maintenance Card/CFE Interface

| Level | Pin # | Direction | Definition |
|---|---|---|---|
| OFFLNE/0 | 073 | to CFE | DLP is off line |
| GPRIF/.0 | 061 | to CFE | Gate off peripheral interface |
| DSEL8/.0 | 060 | to CFE | Display select bit |
| DSEL4/.0 | 085 | to CFE | Display select bit 4 |
| DSEL2/.0 | 186 | to CFE | Display select bit 2 |
| DSEL1/.0 | 086 | to CFE | Display select bit 1 |
| DPLY01/0 | 054 | to MC | Display line |
| DPLY02/0 | 155 | to MC | Display line |
| DPLY03/0 | 055 | to MC | Display line |
| DPLY04/0 | 156 | to MC | Display line |
| DPLY05/0 | 056 | to MC | Display line |
| DPLY06/0 | 157 | to MC | Display line |
| DPLY07/0 | 057 | to MC | Display line |
| DPLY08/0 | 067 | to MC | Display line |
| DPLY09/0 | 168 | to MC | Display line |
| DPLY10/0 | 068 | to MC | Display line |
| DSIMA8/0 | 112 | Bi-Dir | Data simulate line A8 |
| DSIMA4/0 | 012 | Bi-Dir | Data simulate line A4 |
| DSIMA2/0 | 113 | Bi-Dir | Data simulate line A2 |
| DSIMA1/0 | 013 | Bi-Dir | Data simulate line A1 |
| DSIMB8/0 | 114 | Bi-Dir | Data simulate line B8 |
| DSIMB4/0 | 014 | Bi-Dir | Data simulate line B4 |
| DSIMB2/0 | 115 | Bi-Dir | Data simulate line B2 |
| DSIMB1/0 | 015 | Bi-Dir | Data simulate line B1 |
| DSIMC8/0 | 027 | Bi-Dir | Data simulate C8 |
| DSIMC4/0 | 128 | Bi-Dir | Data simulate line C4 |
| DSIMC2/0 | 028 | Bi-Dir | Data simulate line C2 |
| DSIMC1/0 | 129 | Bi-Dir | Data simulate line C1 |
| DSIMD8/0 | 029 | Bi-Dir | Data simulate line D8 |
| DSIMD4/0 | 130 | Bi-Dir | Data simulate line D4 |
| DSIMD2/0 | 030 | Bi-Dir | Data simulate line D2 |
| DSIMD1/0 | 131 | Bi-Dir | Data simulate line D1 |
| PARSIM/0 | 137 | Bi-Dir | Data simulate parity line (odd) |

MAINTENANCE FACILITIES

In FIG. 2 certain maintenance facilities are provided. These consist of a console 50$_c$ (which may include a cathode ray tube CRT, a mini-disk, etc.) and the Maintenance Card, as 20$_{om}$, plus other software packages and hardware which are included in the DLP. Under programmatic control, the console 50$_c$ can be used to manipulate the DLP in such a manner as to determine its internal state for given operations and to commmpare it to a known correct state by use of the Maintenance Card 20$_{om}$. Thus diagnosis of a failing DLP can be made.

The console is the interface between the host system and the host system operator, as well as being the maintenance interface to the I/O subsystem. Maintenance of the magnetic tape data link processor originates at the console, when in the off-line mode; and from the host system, when in the on-line mode of operation. A data base can be supplied on flexible diskettes or magnetic tape to perform diagnosis of the data link processor (DLP). The selection of the test and type of module can be done at the host system by a field engineer or a host system operator.

DIAGNOSTIC TESTING MODES

There are two modes of diagnostic testing, (a) off-line and (b) on-line. In either mode the units undergoing tests are not available to the host system as a resource and must be placed off-line prior to running diagnostics. Diagnostic programs use the console-to-maintenance card interface in the diagnosis of the subsystem modules. These programs can perform a card test on the addressed unit by means of a maintenance data base that is stored on flexible diskettes or is resident in the host system.

OFF-LINE MODE

This mode implies the following:
1. The host systems resources are not available
2. The test data base is console-diskette-resident
3. The operator must supply control information.

ON-LINE MODE

This mode implies the following:
1. The host systems resources are available
2. The test data base is host-system-resident
3. A host resident program performs the diagnosis.

Confidence test programs can be developed which use the message level interface (MLI) to ascertain a confidence level of the I/O subsystem unit or units under test. These tests may be used to isolate a failing unit so that maintenance can be invoked to determine if the cause of the failure is in an I/O subsystem module or in the peripheral device.

PERIPHERAL-DEPENDENT BOARD INTERFACE

As seen in FIG. 3 the peripheral dependent board (PDB) and the Common Front End card are provided with foreplane connectors $80_a$, $80_b$, $80_c$, $80_d$, and $80_{al}$, $80_{bl}$, $80_{cl}$. The interface between the Common Front End and the peripheral dependent board is made of three 50-pin foreplane connectors $80_a$, $80_b$ and $80_c$. Table IV lists the connectors and shows the pin numbers together with the logic names of the signals involved.

PERIPHERAL CONNECTION TO PDB

Connector $80_d$ is called the PDB Peripheral Interface Connector and connects the peripheral dependent board to the MEC $50_M$ which interfaces the magnetic tape transport units 53. Table V shows the signals and connections for the PDB peripheral connector.

TABLE V

| PDB-Peripheral Connector Pin Mapping | | |
|---|---|---|
| Peripheral Connector On PDB | 25 Conductor Coax Cable | Signal Name |
| S75 | SD | INFO15.1 |
| S76 | #D | INFO16.1 |
| S77 | SE | INFO13.1 |
| S78 | #E | INFO14.1 |
| S79 | SG | INFO11.1 |
| S80 | #G | INFO12.1 |
| S81 | SH | SEND...1 |
| S82 | #H | SELECT.1 |
| S83 | SJ | INFO09.1 |
| S84 | #J | INFO10.1 |
| S85 | SK | PARITY.1 |
| S86 | #K | MECLCL.1 |
| S87 | SM | INFO07.1 |
| S88 | #M | INFO08.1 |
| S89 | SN | INFO02.1 |
| S90 | #N | RDYST..1 |
| S91 | SQ | INFO05.1 |
| S92 | #Q | INFO06.1 |
| S93 | SR | BUSY...1 |
| S94 | #R | READY..1 |
| S95 | ST | INFO03.1 |
| S96 | #T | INFO04.1 |
| S97 | SU | CLOCK..1 |

TABLE IV

| | | | | CFE Foreplane Connectors | | | | |
|---|---|---|---|---|---|---|---|---|
| Connector | Pin Number | $-Slide Signal | #-Side Signal | | Connector | Pin Number | $-Slide Signal | #-Side Signal |
| ($80_{al}$) | 1 | 00 | RAMPAR | RAMA4 | | 2 | 38 | CLR/ | GND |
| | 1 | 01 | RAMA8 | RAMA1 | | 2 | 39 | SEMREQ/ | GND |
| | 1 | 02 | RAMA2 | RAMB4 | | 2 | 40 | INRAMD8 | INRAMD2 |
| | 1 | 03 | RAMB8 | RAMB1 | | 2 | 41 | INRAMD4 | INRAMD1 |
| | 1 | 04 | RAMB2 | GND | | 2 | 42 | INRAMPR | TEST14 |
| | 1 | 05 | RAMC8 | RAMC4 | | 2 | 43 | TEST13 | TEST12 |
| | 1 | 06 | RAMC2 | RAMC1 | | 2 | 44 | TEST11 | TEST10 |
| | 1 | 07 | RAMD8 | RAMD4 | | 2 | 45 | TEST9 | GND |
| | 1 | 08 | RAMD2 | RAMD1 | | 2 | 46 | TEST6 | TEST8 |
| | 1 | 09 | INRAMA8 | INRAMB8 | | 2 | 47 | OFFLN/ | TEST5 |
| | 1 | 10 | INRAMA4 | INRAMB4 | | 2 | 48 | BUFFEND/ | AF/ |
| | 1 | 11 | INRAMA2 | INRAMB2 | | 2 | 49 | CLKEN/ | GND |
| | 1 | 12 | INRAMA1 | INRAMB1 | ($80_{cl}$) | 3 | 50 | OPDEC8 | OPDEC4 |
| | 1 | 13 | INRAMC8 | INRAMC2 | | 3 | 51 | OPDEC2 | OPDEC1 |
| | 1 | 14 | INRAMC4 | INRAMC1 | | 3 | 52 | TERMF/ | SEL6/ |
| | 1 | 15 | RCV/ | SIMRCV/ | | 3 | 53 | SEL5/ | SEL4/ |
| | 1 | 16 | DBUSA8 | DBUSA4 | | 3 | 54 | BR6 | GND |
| | 1 | 17 | DBUSA2 | DBUSA1 | | 3 | 55 | #L4 | #L3 |
| | 1 | 18 | DBUSB8 | DBUSB4 | | 3 | 56 | #L2 | #L1 |
| | 1 | 19 | DBUSB2 | DBUSB1 | | 3 | 57 | #K4 | #K3 |
| | 1 | 20 | DBUSC8 | GND | | 3 | 58 | #K2 | #K1 |
| | 1 | 21 | DBUSC2 | DBUSC4 | | 3 | 59 | #J4 | #J3 |
| | 1 | 22 | DUBSD8 | DBUSC1 | | 3 | 60 | #J2 | #J1 |
| | 1 | 23 | DBUSD2 | DBUSD4 | | 3 | 61 | #I4 | #I3 |
| | 1 | 24 | DBUSPR | DBUSD1 | | 3 | 62 | #I2 | #I1 |
| ($80_{bl}$) | 2 | 25 | GND | WE/ | | 3 | 63 | #H4 | #H3 |
| | 2 | 26 | CS/ | RAMAD9 | | 3 | 64 | #H2 | #H1 |
| | 2 | 27 | RAMAD8 | RAMAD7 | | 3 | 65 | #G4 | STOPB/ |
| | 2 | 28 | RAMAD6 | RAMAD5 | | 3 | 66 | #G3 | #CONST6 |
| | 2 | 29 | RAMAD4 | GND | | 3 | 67 | #CONST7 | #CONST4 |
| | 2 | 30 | RAMAD2 | RAMAD3 | | 3 | 68 | #CONST5 | #CONST2 |
| | 2 | 31 | RAMAD0 | RAMAD1 | | 3 | 69 | #CONST3 | #CONST0 |
| | 2 | 32 | PERF/ | GPRIF/ | | 3 | 70 | #CONST1 | GND |
| | 2 | 33 | DSEL8/ | IOSF | | 3 | 71 | #BRANCH2 | #BRANCH3 |
| | 2 | 34 | DSEL2/ | DSEL4/ | | 3 | 72 | SEL3/ | #BRANCH1 |
| | 2 | 35 | SW1/ | DSEL1/ | | 3 | 73 | GND | SEL2/ |
| | 2 | 36 | CONECT/ | GND | | 3 | 74 | A0 | GND |
| | 2 | 37 | LOCAL/ | GND | | | | | |

TABLE V-continued

PDB-Peripheral Connector Pin Mapping

| Peripheral Connector On PDB | 25 Conductor Coax Cable | Signal Name |
|---|---|---|
| $98 | #U | SPARE. .1 |
| $99 | $W | INFO01.1 |

NOTE
75 thru #99 are grounded.

THE PROM CONTROLLER

The PROM controller 13 shown in FIG. 4A is made up of 13 PROM chips located on the CFE card 10$_c$. These chips are combined to make up a 52-bit microcode instruction word. The address lines of the 13 PROM chips are bussed together so that all of the individual address lines are common to every single chip. The chip select on each PROM chip is always enabled (grounded).

The data output of the 13-chip PROM matrix forms the 52-bit word. This word is read out of the address that is present on the common input address line A0-A9. The PROMs herein are basically unclocked devices so that means is required to synchronize their outputs with an eight megahertz clock which feeds through gate 24. This is done by making use of register chips 14. The register chips contain eight flip-flops each. Thus, seven chips are used to synchronize and latch the 52-bit micro-code word. This latched micro-code instruction word is used to control the operation of the entire data link processor. Every eight-megahertz clock pulse latches the next subsequent word into the register chip 14.

Different types of data link processors require their own unique micro-code. Thus, all Common Front End cards will contain identical hardware except for the 13 PROM chips. Although the PROM word physically contains 52-bits, only 49 bits are used by the micro-code program. The remaining three bits are not parity checked. Tables VIa and VIb indicate the 49-bit micro-code word, by bit position and name. All PROM output signal names are preceded by a "pound sign" (#) so that they are easily recognizable. Bit 32 of the micro-code word is the odd parity bit. The CFE card is made to continually check for odd parity and it halts the micro-code program if a parity error (even parity) occurs on any 49-bit PROM micro-code word.

TABLE VIa

MT-DLP Common PROM Output Signals

| PROM CFE Name | PROM Word Bit No. | PDB Name |
|---|---|---|
| #Z4 | 48 | #NEXT9 |
| #A1 | 47 | #NEXT7 |
| #A2 | 46 | #NEXT6 |
| #A3 | 45 | #NEXT5 |
| #A4 | 44 | #NEXT4 |
| #B1 | 43 | #NEXT3 |
| #B2 | 42 | #NEXT2 |
| #B3 | 41 | #NEXT1 |

TABLE VIa-continued

MT-DLP Common PROM Output Signals

| PROM CFE Name | PROM Word Bit No. | PDB Name |
|---|---|---|
| #B4 | 40 | #NEXT0 |
| #C1 | 39 | #NEXT8 |
| #C2 | 38 | #BRANCH1 |
| #C3 | 37 | #BRANCH2 |
| #C4 | 36 | #BRANCH3 |
| #D1 | 35 | #BRANCH4 |
| #D2 | 34 | #BRANCH5 |
| #D3 | 33 | #LCPSTL/ |
| #D4 | 32 | #PARITY |
| #E1 | 31 | #CONST7 |
| #E2 | 30 | #CONST6 |
| #E3 | 29 | #CONST5 |
| #E4 | 28 | #CONST4 |
| #F1 | 27 | #CONST3 |
| #F2 | 26 | #CONST2 |
| #F3 | 25 | #CONST1 |
| #F4 | 24 | #CONST0 |
| #G1 | 23 | #LDINT/ |
| #G2 | 22 | #LDSTK/ |

TABLE VIb

MT-DLP PDB PROM Output Signals

| PROM CFE Name | PROM Word Bit No | PDB Name |
|---|---|---|
| #G3 | 21 | #PADLD/ |
| #G4 | 20 | #PADCTU |
| #H1 | 19 | #RAMWE |
| #H2 | 18 | #PSHDN |
| #H3 | 17 | #SADCTU/ |
| #H4 | 16 | #SREGLD/ |
| #I1 | 15 | #SHFTOP |
| #I2 | 14 | #FSL4 |
| #I3 | 13 | #FSL2 |
| #I4 | 12 | #FSL1 |
| #J1 | 11 | #OPDEC |
| #J2 | 10 | #DATAVK |
| #J3 | 09 | #PINTLD/ |
| #J4 | 08 | #IDSEL/ |
| #K1 | 07 | #ADDSLA |
| #K2 | 06 | #ADDSLB |
| #K3 | 05 | #MUXSLA/ |
| #K4 | 04 | #MUXSLB/ |
| #L1 | 03 | #FLGCLR/ |
| #L2 | 02 | #TREGLD |
| #L3 | 01 | #LPWPRE |
| #L4 | 00 | #BRANCH6 |

MAINTENANCE CONTROL

As seen in FIG. 4A, the Common Front End contains receivers 15, 16, 17 which include decoding logic. Receiver 17 is used for operation of the maintenance control lines 33, 34. Table VII shows the addressing signals for maintenance mode of the data link processor. Thus, this Table lists all possible Maintenance Card to Common Front End addressing codes with the response of any given data link processor. The Maintenance Card (MC) has the ability to address any one of eight DLPs in the base module.

TABLE VII

ADDRESS CODES: DLP Maintenance Mode Addressing (Maintenance Card to CFE)

| Base Local (BASLCL/0) | Address Valid (ADRYLD/0) | Address Equal (LOCnn/.0) | Action Produced |
|---|---|---|---|
| 1 | 1 | X | Normal on-line mode |
| 1 | 0 | 1 | |
| 1 | 0 | 0 | Standard local mode, all maintenance available |
| 0 | 0 | 0 | Local mode with base in local |
| 0 | 0 | 1 | Base in local and the DLP clocks are disabled |
| 0 | 1 | X | Base single-pulse |

1 = high.
0 = low.
X = don't care.

The high order address line from the Maintenance Card (LOC 16/.0) must be "high" in order to address a DLP. It will be seen that all backplane signals are low active. The other four address lines provide encoding for DLP selection. The CFE does not decode the maintenance address until the Maintenance Card indicates the address is valid and stabilized by driving ADRVLD/0 low.

The Maintenance Card drives four lines which are used to enable unique maintenance features in any given DLP or connection module.

When in local mode, the CFE uses one of these lines (SWH.1/.0) for allowing the Maintenance Card to drive the address lines of the CFE PROM 13. When this line (SWH.1/.0) is low, the peripheral dependent board drives RCV/high and drives SIMRCV/low, as well as not driving the 17-line data bus 32.

Table VIII shows a list of the Maintenance Card lines which drive the PROM address lines in this local mode. This feature of the maintenance operation is used to varify PROM controller 13 integrity.

TABLE VIII

Maintenance Lines Driving PROM Address

| PROM Address Line | Maintenance Line | (Data Simulation) |
|---|---|---|
| A9 | DSIMC8 | |
| A8 | DSIMC4 | |
| A7 | DSIMA8 | |
| A6 | DSIMA4 | |
| A5 | DSIMA2 | |
| A4 | DSIMA1 | |
| A3 | DSIMB8 | |
| A2 | DSIMB4 | |
| A1 | DSIMB2 | |
| A0 | DSIMB1 | |

RAM BUFFER

The Common Front End $10_c$ contains a random access memory buffer (RAM) 22. This RAM buffer (data RAM) consists of 1,024 17-bit words. All inputs and outputs to this RAM are received by or driven by the peripheral dependent board PDB 80. The designation for the open collector line (60 nanosecond read access RAM) is RWON. This storage area is used to store the data, the OP code, the descriptor links, the descriptor links longitudinal parity word (LPW) and the various flags that are required to properly control the operation of the data link processor.

DLP ADDRESS AND REQUEST JUMPERS

There are eight backplane lines which are used by the Distribution Card(s) to address any one given data link processor (DLP). Likewise, eight backplane lines are used by the data link processors (DLPs) to indicate a service request to the Distribution Cards. The 16 lines are unique in that only one data link processor (DLP) can use a given request line. Further, the request lines are graded by priority. Once the priority of a data link processor is determined, that priority request line is "jumpered" for use on the Common Front End Card (FIG. 3). The request and the address lines are identically numbered and operate as pairs. Therefore, once a request priority level is determined and jumpered, the corresponding address line is jumpered on the Common Front End Card.

DLP LOCAL ADDRESS JUMPERS

The Common Front End Card requires a minimum of two and a maximum of three jumpers (FIG. 3) to implement its local maintenance address. This address is used by a Maintenance Card, as $20_{om}$, to address a data link processor, as $20_{oo}$. The data link processor's local address must always correspond to its on-line DLP address.

STACK REGISTER

The stack register 11 consists of three binary counter chips. This register contains the value of the current PROM address, or the value of the address to be used when returning from a subroutine by way of a stack-branch operation.

The Magnetic Tape Data Link Processor will be seen to be made of two slide-in printed circuit cards. These are the Common Front End (CFE) card and the Peripheral Dependent Board (PDB). Each of these two boards are totally different in function and structure; however, when they are used together they make up the totality of the Magnetic Tape DLP.

The primary function of the CFE 10 is to provide a device in which to store and execute the applicable micro-code. The micro-code is used to sequence the operation of the data link processor (DLP). The Random Access Memory ($RAM_{22}$) is housed on the Common Front End Card and provides internal data link processor storage for various uses such as data storage, translation storage, etc.

The peripheral dependent board (PDB), on the other hand, contains the necessary logic to interface the peripheral device (magnetic tape) to the host system through the message level interface (MLI). (The message level interface 15, will also be seen in U.S. Pat. No. 4,162,520 in FIGS. 1A, 2 and 3). The logical elements of the PDB are controlled by using the micro-code coming from the Common Front End (CFE). However, also, many signals are passed from the peripheral dependent board to the Common Front End to allow logical decision-making by the micro-code.

As seen in FIG. 4A there are interfaces to the front plane (double arrow) and to the backplane (single arrow) which involve the Maintenance Card. These MC lines will be seen as lines 30, 34 and 40.

MAINTENANCE CARD CONNECTION

There is a Maintenance Card-Common Front End interface (MC/CFE) which is used when the Maintenance Card (MC) requires connection to a data link processor in order to perform normal maintenance functions. The Maintenance Card tries to connect to a DLP by driving the appropriate local maintenance address line (LOC nn/.0) and the signal ADRVLD/0 (address valid) low. This action causes the addressed CFE $10_c$ to recognize the MC connection and to drive the logic term LOCAL/.1 low. The LOCAL/.1 term is used to enable a backplane receiver chip which allows the MC to take the DLP off-line (OFFLNE/0 signal coming from the MC goes low).

If the MC takes a DLP off-line, it is unavailable to the host system. If the DLP is off-line it does not see any DC (Distribution Control Card) attempts at connection, and all DLP requests to the DC are inhibited.

The Maintenance Card always takes the data link processor off-line when maintenance routines are called for. This is done so that maintenance functions (such as single-pulse, and PROM verification) do not interfere with normal distribution control card operations to the on-line data link processors. The logic germ LOCAL/.1, when low, is also used to enable the following functions:

1. It allows GPRIF/.0 (from the Maintenance Card) to turn off the data link processors peripheral interface.
2. It becomes LOCAL/ which is used by the peripheral dependent board PDB for bus interface directional control logic.
3. It is used to allow the Maintenance Card (MC) local clear and PROM verification SW1/) function.
4. It is used by the Common Front End Card (CFE) for the development of the clock-enable term CLKEN.

DISTRIBUTION CARD CONNECTION

The following discussion involves the connection mechanism as used by the Distribution Control Card/Common Front End Card interface (DC/CFE) when the Distribution Control Card requires connection to a data link processor. This connection will be initiated by a Distribution Control Card (DC) poll test or by a data link processor (DLP) initiated poll request. The connection logic is shown in FIG. 4D.

The CONST lines 4-7 are fed as input to a 4-bit binary counter J3-C. The output of this counter is fed to a tri-state inverter C4-C to provide, as output, the "status" lines LCPSTU--. The data link processor address LCPADn/0 and the off-line signal OFFLN provide inputs to buffer chip M5-C whose output is fed through inverter P4-C to form the LCPAD signal to NAND gate M3-C. NAND gate M3-C also has signal inputs for parity error (PERF/) and off-line (OFFLN/). The output of NAND M3-C is the signal CONECT/ which connects to the PDB bus directional control PROM and also provides inputs to inverters C4-C, C4-C1, E4-C and also to the buffer F4-C. The CONECT/ also is formed as input to NAND B3-C having an output which is fed to NOR gate A4-C. The NOR gate A4-C is fed to inverter B4-C to form the logic control signal CLRD. The outputs of the inverter C4-C1 form the signal IOSND/.0 (input-output send) and the signal LCPCON/0 (data link processor connected). The buffer F4-C provides a distribution card strobe output and a distribution card terminate signal. The inverter E4-C provides a strobe level signal LCPSTL/0 (data link processor strobe level).

The Distribution Control Card (DC) will attempt to connect to a data link processor (DLP) by driving the appropriate DLP address line (LCPADn/0) low. This backplane signal is applied to a buffer chip (M5-C) which is enabled when the data link processor (DLP) is on-line. The output of the buffer chip is then fed through an inverter (P4-C) and applied to a 3-legged NAND gate (M3-C) to become the term-CONECT/. This CONECT/ term is used to enable the following set of signals on the DC/CFE interface:

1. LCPCON/0. This line goes low when the DLP is connected.
2. LCPSTUn/0. These are the four data link processors status lines.
3. IOSND/.0. This is the state of the I/O-send flip-flop.
4. LCPSTL/0. This is the data link processor strobe signal.
5. STIOL/.0. This is the host system strobe signal.
6. TERM/..0. This is the host system terminate signal. SELCLR/0. This is the Distribution Card (DC) to the data link processor (DLP) selective clear signal.
8. DATAxn/0. This is the 17-bit data bus.

All these backplane signals are low active and are enabled only when (a) the CFE is properly addressed by the Distribution Control Card (DC) and (b) a connection is possible, that is, when the data link processor is on-line, and there is no PROM parity error. The actual state of the enabled lines is dependent upon the logical condition of the data link processor and the Distribution Control Card (DC) at the time of the connection.

DATA LINK PROCESSOR REQUESTS

A DLP request is the method by which a data link processor can notify the Distribution Control Card that it needs host system attention. A request can be considered to be a DLP interrupt (REQ) to the Distribution Card (DC).

A DLP request is made to the Distribution Control Card when the DLP drives its jumpered request line (LCPRQn/0) low, or when the DLP drives its jumpered request line and EMRREQ/0 (emergency request) low. Both types of these requests can be generated on the Common Front End Card (CFE) by the PROM stored micro-code program. When the micro-code program drives the PROM output line #LDINT/ (load interface) low, the signals #CONST1 (for emergency request), and #CONST2 (for request) are loaded into a register called the request (FIG. 4A) latch 19 (FIG. 4A) at CLK8/time. Combinational type logic on the Common Front End allows "emergency request" to be enabled on the backplane anytime it occurs, if the data link processor is "on-line". If a DLP issues an emergency request, it also issues a non-emergency request. This is done so that the Distribution Control Card can determine which DLP is doing the emergency-requesting.

The backplane line EMRREQ/0 is common to all data link processors in the base module, and the LCPRQn/0 lines are each unique. If a data link processor issues a non-emergency request, it is "enabled" on the backplane only if the data link processor is on-line and no other data link processors in the base module are doing any emergency-requesting.

DATA LINK PROCESSOR DATA TRANSFER RATE

Two possible modes of operation govern the data transfer rate between the data link processor DLP and the main host system 10. These modes are called (a) demand mode and (b) burst mode.

Demand mode causes data transfers to occur at a rate of less than four-megahertz. Burst mode permits data word (16-bit) transfers to occur at a four-megahertz rate, that is, 64 megabits per second.

The data link processor (DLP) and the Distribution Control Card (DC) send "strobe acknowledge" signals back and forth to each other when they present or accept data. The DLP sends the term LCPSTL/0 (DLP strobe level) to the Distribution Control Card, and the Distribution Control Card sends STIOL/.0 to the data link processor. These strobing signals are exchanged during both the demand mode and the burst mode operations. The data transfer rate is determined by the speed at which these strobe signals are exchanged. FIG. 4E show a data transfer timing diagram from the Distribution Control Card (DC) to the data link processor. The Common Front End Card (CFE) receives a STIOL/.0 signal from the Distribution Control Card, and synchronizes it with the 8-megahertz clock by the use of a Schottky J-K flip-flop whose ouputs are named AF (asynchronous flop) and AF/. The synchronized strobe level AF is used on the Common Front End Card for PROM address bit A0 micro-code testing. The AF/ signal is available for use on the peripheral dependent board (PDB) by way of a foreplane connector pin.

DEMAND MODE

During buffer loading operations, the Distribution Card (DC) informs the data link processor that data is available by driving STIOL/.0 low. The data link processor micro-code program informs the Distribution Card that it has accepted the data that is on the Distribution Card interface line by driving the PROM logic term # LCPSTL/ low.

LCPSTL/ becomes LCPSTL/0 to the Distribution Card and causes the Distribution Card (DC) to drive the STIOL/.0 high until the next new word of data is available.

During buffer read operations, the Distribution Card informs the data link processor that it is ready to accept new data by driving STIOL/.0 low. The data link processor micro-code instructions inform the Distribution Card that new data is available on the Distribution Card interface line by driving the PROM logic term #LCPSTL/ low. #LCPSTL/ becomes LCPSTL/0 to the Distribution Control Card. The Distribution Card informs the data link processor that it has accepted the data by driving the STIOL/.0 high.

The direction of the data flow is controlled by the PROM output term #CONST3. The term #CONST3 is clocked into the request latch 19 at PROM signal #LDINT/ (load system interface) time and becomes IOSF (I/O send flop). The state of IOSF is sent to the Distribution Control Card as IOSND/.0, and is used to inform the Distribution Control Card of the interface bus line direction. The state of IOSF is also sent to the peripheral dependent board (PDB) 80. The PDB 80 uses IOSF to assist in developing the interface bus line directional control logic. This logic determines which data link processor bus is active and what drivers or receivers must be used.

BURST MODE

A data link processor (DLP) selects the burst mode of operation by driving both of the PROM logic terms LDINT/ (load system interface) and CONST 0 low. This action causes a STOPB flip-flop to set. The setting of the STOPB flip-flop causes the logic term STOPB to go low. When STOPB goes low, and the data link processor is connected, the Distribution Control (DC) interface signal LCPSTL/0 is held low until the STOPB flip-flop is reset. (STOPB=stop burst; when "high", indicates DLP not in burst mode).

During a buffer load operation, the action of LCPSTL/0 remaining low causes the Distribution Card to see an immediate response to its own strobe (STIOL/.0), which it sent when it presented new data on the interface data lines. A data link processor running in the burst mode can accept data at this rate because of its micro-code programming and its eight-megahertz clock rate.

During buffer "read" operations, the action of LCPSTL/0 remaining low causes the Distribution Card to see that new data is being presented on the interface data lines immediately. The Distribution Card responds by driving STIOL/.0 high after it has taken in the data.

The burst mode of operation is ended if the peripheral dependent board 80 drives the logic term BUFFEND/ "low" in conjunction with a Distribution Card strobe. This action causes the STOPB flip-flop to reset. The resetting of the STOPB flip-flop causes LCPSTL/0 to go high. The peripheral dependent board drives BUFFEND/ "low" when the designated end location of the RAM buffer 22 is reached. The peripheral dependent board generates BUFFEND/ for buffer load and buffer read operations. The STOPB flip-flop can also be reset if the data link processor receives a "terminate" or "clear" from the Distribution Control Card (DC) or the Maintenance Card.

CLEAR FUNCTIONS

The CFE card $10_c$ makes use of combinational type logic to implement its clearing functions. A description of clearing functions applicable to all data link processors using the Common Front End Card follows:

Power-Up Clear:

A power-up clear signal is provided to the base module from either the power supply of the cabinet or from some external source as determined by the host system 10. This signal is attached via coaxial cable to a pin of the maintenance card backplane connector. The Maintenance Card uses this signal to create the master clear, MSTCLR/0. The signal MSTCLR/0 clears the data link processor if it is on-line.

Base Clear:

The base clear function is provided by a pushbutton switch located on the Maintenance Card foreplane connector. The switch is ORed with the power-up clear and performs the same function as a power-up clear.

Maintenance Local Clear:

If the Maintenance Card is connected to a data link processor, the Maintenance Card can clear the data link processor by driving LCLCLR/0 low (clear level from Maintenance Card).

Host System Master Clear:

The host system 10 can issue a master clear signal across its message level interface 15$_i$ (MLI). The Distribution Control Card (DC) contains a host system jumper option which, if installed, causes the master clear (MSTCLR/0) to go "low". This signal clears all the data link processors that are not addressed by the Maintenance Card. If the Distribution Control Card host system option jumper is not installed, then the host master clear signal is not passed through the Distribution Control Card to the backplane.

Host System Selective Clear:

The host system 10 can clear a single data link processor during a standard poll test operation by driving the message level interface (MLI) line TRM+MC/1 low. This action causes the Distribution Card to drive SELCLR/0 low. The SELCLR/0 being "low" causes the connected data link processor to clear.

Figure 4B:
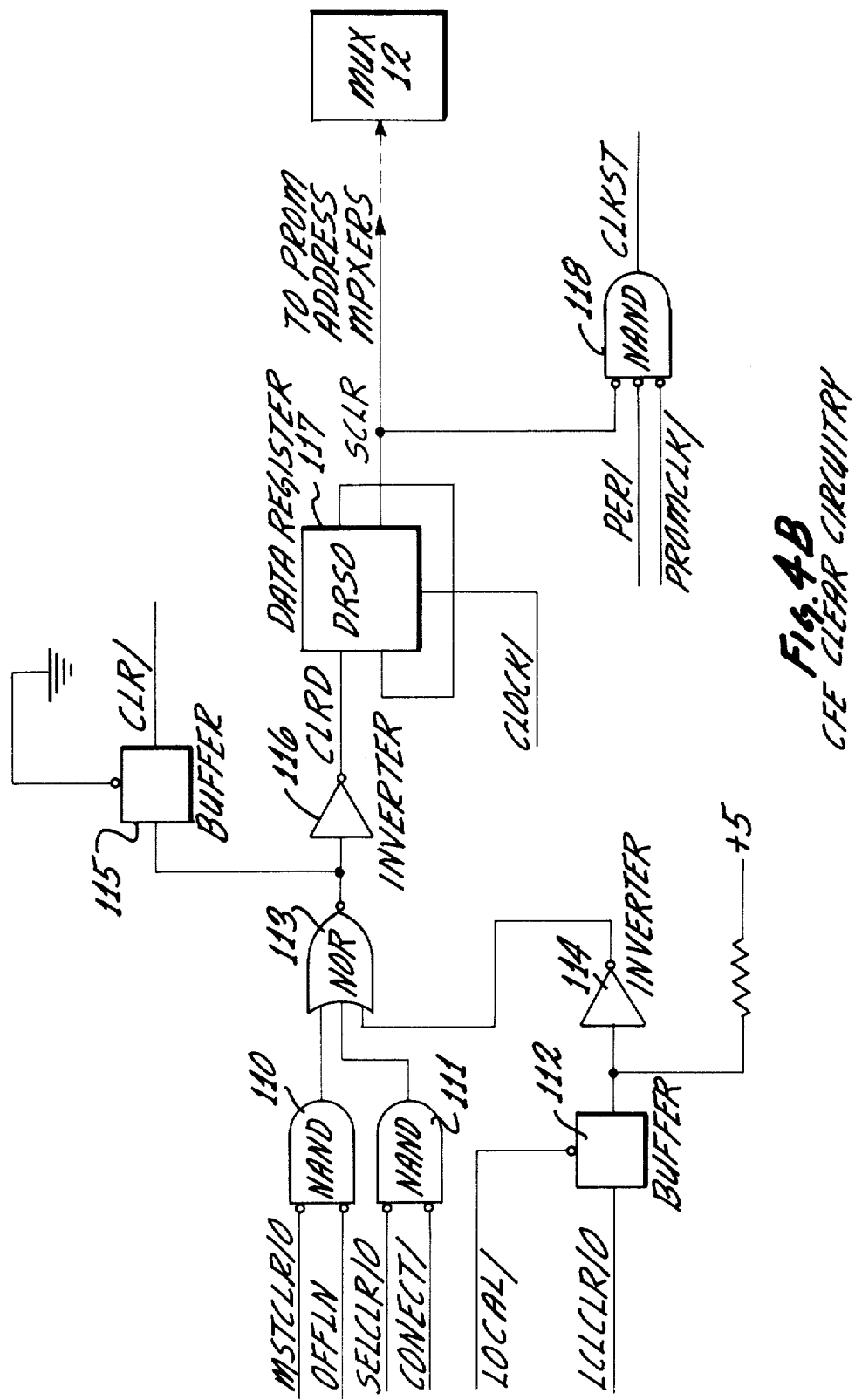
FIG. 4B is a circuit of the common front end clear circuitry.

FIG. 3 shows in schematic form the physical structure of the Common Front End (CFE) card 10$_c$ while FIG. 4A shows the basic circuit block diagram of the Common Front End Card. Included in the CFE is the clear circuitry shown in FIG. 4B. It will be seen that NOR gate 113 has inputs from NAND gates 110 and 111 in addition to an input from inverter 114 which is fed by buffer 112. The output of gate 113 is fed to buffer 115 and also to inverter 116. Inverter 116 feeds its signal to a Schottky data register chip 117 which provides an output to the PROM address multiplexor 12 of FIG. 4A. The output of data register 117 is also used to provide one of the inputs to NAND gate 118.

A "low" signal which results on the output of the NOR gate 113 occurs if any one of the following conditions is met:

1. MSTCLR/0 and OFFLN are both "low".
2. SELCLR/0 and CONECT/ are both low.
3. LCLCLR/0 and LOCAL/ are both low.

The "low" output of NOR gate 113 is used to perform the following functions:

1. The output is fed through a buffer chip 115 to become signal CLR/. CLR/ clears the PROM parity error flip-flop (and flip-flops SOTB, AF, and TERMF) on the CFE 10$_c$.
2. CLR/ is sent to the peripheral dependent board (PDB) 80 to clear the specific peripheral-dependent logic.
3. The low output signal of NOR gate 113 is sent through an inverter 116 and is applied to one input of the data register chip 117. It is sent as the logic term CLRD. The signal CLRD is double synchronized with CLOCK/ and becomes the signal SCLR (synchronized clear).
4. The signal SCLR from register 117 is used to force the PROM clock-disabling term CLKST (clock stop) "low". This is done in the event that a PROM parity error may have caused CLKST to go high.
5. The SCLR signal is used to disable the PROM address multiplexor chips 12. This forces the PROM address lines to all zeros. Address zero is the starting address of all data link processor micro-code programs.

CFE CLOCK CONTROL

The clock control logic in the CFE 10$_c$ uses combinational type logic (NAND gates, NOR gates, inverters, buffers, and a Schottky data register chip); in order to enable or disable the always-present 8-megahertz backplane clock (CLOCK . . . 0). The circuitry for the CFE clock control is shown in FIG. 4C. The CFE clock control logic constantly monitors the state of the maintenance bus 30 to determine how it should supply clock signals to the data link processor. The Table VII there was shown the available clock control options and the maintenance bus line states that are necessary to cause the various options to be active. Table VIII showed the maintenance lines for driving the PROM address lines A0–A9.

In the CFE clock control circuitry shown in FIG. 4C, it will be seen that the NAND gate A3 has three inputs and the NAND gate 13-1 has four inputs. The first input to NAND gate A3 is from the data register C3 along the SCLR line. The second input to gate A3 is the line PERF/. The PERF signal is the PROM parity flip-flop signal. When "high", it indicates that an error has been detected on the PROM output register 14, thus stopping the DLP clock. The PERF/ signal is the complement of PERF. The third input to gate A3 is from the PROMCLK/ output of NOR H4-1.

The first input to gate 13-1 is the SCLR line. The second input of gate 13-1 is the PERF/ line. The third input to gate 13-1 is from the CLKEN line and the fourth input to gate 13-1 is the output of the buffer N5-1.

The NAND gate M3 has one input from inverter P4 (ADLOC) and another input coming from the inverter B4-1 (BASLCL/0).

The input for the data register C3 comes from NOR gate A3-2 which has one input from inverter B4, one input coming from NOR gate A3-1, and one input coming from the start START/.0. The NOR gate A3-1 has two inputs, one of which is the line BASLCL/0 and the other input is the line LOCAL/.1.

The output of gate A3 is fed to the input of NOR gate H4-1. The output of NAND gate 13-1 is fed to the input of NAND gate H4-13. The output of inverter H5 (CLOCK . . . 0) is fed to both the input of gate H4-2 and gate H4-13.

The output of gate A3 is fed to the input of NOR gate H4-1 to form the signal line PROMCLK/. The output of NAND gate H4-13 is fed to buffer 14-1 and to buffer G4.

NORMAL ON-LINE MODE

When certain of the following conditions are met, then all data link processor clocks are active at the 8-megahertz rate. These conditions are:

1. BASLCL/0 is high (the base module is not in local).
2. LOCAL/.1 is high (the DLP is not Maintenance Card (MC) addressed).
3. PERF/ is high (no PROM parity error). The signals BASLCL/0 and LOCAL/.1, both being "high", causes a "high" on to one input of the Schottky data register C3. This register chip is clocked by the always-present signal CLOCK/. This signal is derived from the backplane clock signal CLOCK . . . 0 after a triple inversion. One output of the register chip C3 becomes the logic term clock enable (CLKEN). The signal clock enable is NANDed on two gates (A3-4 and 13-1) using the signals PERF/, SW1/, and the output of NAND gate M3. Gate M3 has inputs which are:
   a. This signal ADLOC/ (after inversion). The ADLOC/ is low when the DLP is not addressed by the MC, or when ADRVLD/0 is high.

b. The backplane signal BASLCL/0 (after inversion).

The output of NAND gate A3-4 becomes the signal logic term B (P-CLKEN) and this is NANDed with the signal CLOCK . . . 0 (after inversion by inverter H5 which is fed as one input to gate H4-2). The output of gate H4-2 is fed through a NOR gate H4-1 to form the signal PROMCLK/. This signal PROMCLK/ is used to clock the PROM data registers 14 and the stack register 11 of FIG. 4A.

The output of NAND gate 13-1 becomes the signal CLKEN/. This signal CLKEN/, when "low", enables the 8-megahertz backplane clocks on the peripheral dependent board, PDB 80.

The CLKEN/ signal is NANDed with the signal CLOCK . . . 0 (after inversion) at the gate H4-13. The output of gate H4-13 is fed through one inverter buffer 14-1 and also through one non-inverting buffer G4 to become the signals respectively CLK8/ and CLK8 (8-megahertz clock. These clock signals are used in the Common Front End Card $10_c$.

STANDARD LOCAL MODE

The standard local mode of "maintenance" is operative under the following conditions: (Also see Table VII).
1. BASLCL/0 is high (base is not in local).
2. ADRVLD/0 (address valid) is low; and the LOCnn/.0 lines on the maintenance bus are valid.
3. The LOCnn/.0 lines equal the local address jumpers on the CFE $10_c$. This equal comparison together with the ADRVLD/0 being low, forces LOCAL/.1 into low. LOCAL/.1 low means that the DLP is "Maintenance Card addressed".

In this mode all the maintenance functions are available; for example, the Maintenance Card can now:
1. select the single-pulse mode.
2. perform PROM micro-code verification.
3. set up known conditions by manipulating the PROM address during single-pulse operations, and test for known predicted results by sampling the maintenance bus display (DPLY) and the data simulate (DSIM) lines.

SINGLE-PULSE MODE

After the Maintenance Card has localized the data link processor (DLP), it can place the DLP in a single-pulse mode by driving the signal SP/ . . . 0 into "low". This action forces the logic term CLKEN into "low" because the NOR gate A3-2 of FIG. 4C is disabled by the following logic:
1. Signal SP/ . . . 0 is inverted into "high" and disables the top input line of gate A3-2.
2. The signal LOCAL/.1 is low because the DLP is not Maintenanced Card addressed. This action disables the middle input line of gate A3-2 because of the high signal output of gate A3-1. The signal START/.0 is high and disables the third input of gate A3-2. When gate A3-2 is disabled, a low signal is set into the data register C3 at CLOCK/time. The output signal CLKEN, when low, turns off NAND gates A3-4 and 13-1, and causes their outputs to go high and to disable the NAND gates H4-2 and H4-13. When these two gates are disabled, the DLP clocks are turned off.

Once the DLP is placed into a single-pulse mode, the Maintenance Card can issue from 1 to 4,096 clocks by driving the START/.0 low. START/.0 is a pulse which effectively is a window around a desired number of clocks that the Maintenance Card wants issued. During the time frame when START/.0 is low, the high signal output of gate A3-2 is clocked into the data register C3 by the always-present clock signal CLOCK/. The CLKEN now becomes a pulse rather than a level, and the DLP clocks are enabled only during the low active time span of START/.0.

After the data link processor (DLP) has been placed into the single-pulse mode, the Maintenance Card can take the DLP out of it by driving SP/ . . . 0 high. The signal SP/ . . . 0, when high, forces a high level input into register C3 as follows (FIG. 4C): The signal SP/ . . . 0 is inverted low by the inverter B4. This low signal is fed into NOR gate A3-2 and causes its output to go high. This high level is clocked into data register C3 with CLOCK/ and becomes CLKEN. The signal CLKEN, when high, enables all the data link processor's clocks.

PROM MICRO-CODE VERIFICATION

If the Maintenance Card has localized and placed the data link processor into the single-pulse mode, it can read any Common Front End PROM micro-code word by driving the signal SWH.1/.0 low. The signal SWH.1/.0 is routed through the buffer N5-1 (FIG. 4C) to become the logic term SW1/. This signal SW1/ is sent to the peripheral dependent board PDB 80 and is used in the bus interface directional control logic in order to develop the logic term SIMRCV/, (Simulate Receive, FIG. 4A, line 33). When SIMRCV/ is low, the maintenance bus lines $10_{dm}$ DSIMnn/0 of FIG. 5B are gated into the inputs of PROM address multiplexor chips 12 of FIG. 4A. The SW1/ also forces the PROM address multiplexors 12 to select the DSIMnn/0 data as the actual PROM address. This way the Maintenance Card controls the current PROM address. SW1/ is also tied to one of the inputs of NAND gate 13-1, FIG. 4C, and is used to keep the clock signals CLK8/, CLK8, and the clock-enable signal CLKEN/ (to the peripheral dependent board 80) turned off.

When the Maintenance Card issues a single pulse clock, the PROMCLK/ latches the addressed PROM data into the PROM registers 14 (FIG. 4A) because SW1/ is not tied to the NAND gate A3. The Maintenance Card now has the current PROM word available for sampling. The Maintenance Card can now read the PROM data (8-bits at a time) by driving the maintenance bus lines DSELn/.0. The DSELn/.0 lines 34, FIG. 4A, are used on the CFE $10_c$ to select which 8 data bits will be enabled onto the maintenance bus lines DPLYnn/0, at 40 of FIG. 4A. Seven reads are required to sample one entire micro-code address.

LOCAL MODE WITH BASE IN LOCAL

Under certain conditions the maintenance mode is operatively in effect; these conditions are:
1. BASLCL/0 is low (the base is in local).
2. ADRVLD/0 is low (that is, the LOCnn/.0 lines on the maintenance bus are valid).
3. The LOCnn/.0 lines equal the local address jumpers on the CFE $10_c$. This equal comparison, along with ADRVLD/0 low, forces LOCAL/.1 low also. LOCAL/.1, when low, means that the data link processor DLP is being Maintenance Card addressed. This mode of operation causes the addressed data link processor to function in exactly the same manner as the standard local mode. All unaddressed DLPs disable their own clocks.

BASE MODULE IN LOCAL MODE AND DLP CLOCKS DISABLED

This is a mode of operation which takes place when the following conditions are satisfied:
1. BASLCL/0 is "low" (the base is in local).
2. ADRVLD/0 is low (the LOCnn/.0 lines are valid).
3. The LOCnn/.0 lines do not equal the CFE local address jumpers. This "unequaled" comparison along with ADRVLD/0 being low, forces LOCAL/.1 high and ADLOC/low. The LOCAL/.1 when high, means that the DLP is not Maintenanced Card addressed.

In this mode all the DLP clocks are disabled because the BASLCL/0 low level is inverted by the inverter B4-1 (FIG. 4C). This level "high" is NANDed by gate M3 with the inverted ADLOC/ signal (inverted by P4). When both inputs to gate M3 are "high", the output goes low and disables the NAND gate A3-4 and 13-1. The outputs of these gates both go high and disable the gate H4-1 and H4-13. When these two gates are disabled, all the DLP clocks are inhibited.

BASE SINGLE-PULSE

The single-pulse maintenance mode is in effect when the following conditions occur:
1. BASLCL/0 is "low" (the base is in local).
2. ADRVLD/0 is high (that is, the LOCnn/.0 lines on, the maintenance bus are invalid).

In this mode of operation the Maintenance Card can place the entire base in a single-pulse mode by driving the logic as follows:
1. SP/. . . . 0 low -- this action disables the top input of the NOR gate A3-2
2. BASLCL/0 is low. This action puts the base in local and causes the output of NOR gate A3-1 to go high. This high level disables the middle input line of NOR gate A3-2.
3. START/.0 high disables the bottom input of NOR gate A3-2.

When NOR gate A3-2 (FIG. 4C) is disabled, its output goes low. This low output is latched into the data register C3 and becomes the logic term CLKEN. This clock enable line, when low, disables NAND gates A3-4 and 13-1. The outputs of these NAND gates go high and disable the gates H4-1 and H4-13. When the gates H4-1 and H4-13 are disabled, then all DLP clocks are inhibited.

The "base single-pulse" maintenance mode of operation will make all data link processors respond to single-pulse because ADRVLD/0 is high and BASLCL/0 is low. The signal ADRVLD/0 when high, disables the tri-state 8-2-1 multiplexor chip (12, FIG. 4A) on the CFE that is used to generate the logic terms LOCAL/.1 and ADLOC/. When this multiplexor chip is disabled, both signals are pulled up high with 1100 ohm resistors to +5 volts. ADLOC/, when high, (after inverson to "low" by the inverter P4, FIG. 4C) disables the NAND gate M3. The high level output of gate M3 allows the single-pulse clock to be enabled when the Maintenance Card drives the signal START/.0 low. Further description of the single-pulse operation has been previously described in the "standard local mode" of operation.

STACK REGISTER OPERATION

The operation of the stack register 11 (FIG. 4A) is controlled by the state of a PROM 13 output signal line #LDSICK/. The signal #LDSICK/ is held low during non-subroutine micro-code instructions. This low level is applied to the lowenable inputs of the 3 stack register chips 11. This action causes the stack register 11 to load and hold the current PROM micro-code address.

All micro-code programs have the ability to enter one level of subroutine by driving and holding the signal #LDSICK/high. With #LDSICK/ going high the following actions will occur:
1. The stack register load function is disabled.
2. The stack register count function is enabled.

The signal #LDSICK/ of FIG. 4A is also routed through a Schottky data register chip to become the logic term STCLKEN/. This signal is then inverted and used to count up the stack register plus one. This address is held in the register until the subroutine is completed. This updated address is used when the subroutine does a stack branch to return to the main body of the micro-code instructions. The non-subroutine code is then re-entered and the signal #LDSICK/ goes low.

MAINTENANCE DISPLAY LINES OF COMMON FRONT END (CFE)

The CFE $10_c$ contains standard items such as inverting tri-state buffers and eight-to-one multiplexor chips that are used to enable the maintenance display lines 40 of FIG. 4A (DPLY01/0-DPLY10/0). The lines 40 are shown with a /10 to indicate the 10 individual lines which compose this group of lines. Table IX lists the various individual display lines (DPLY01/0-DPLY10/0).

TABLE IX

| Maintenance Display Lines*** | CFE Signals Displayed With Given Display Select Codes | | | | | | | | |
|---|---|---|---|---|---|---|---|---|---|
| | DSEL8/,DSEL4/,DSEL2/,DSEL1/Values* | | | | | | | | |
| | (GRPO = 0) 1111** | 0111 | 0110 | 0101 | 0100 | 0011 | 0010 | 0001 | 0000 |
| DPLY01/0 | STCKA9 | * | * | * | * | * | * | * | * |
| DPLY02/0 | STCKA8 | * | * | * | * | * | * | * | * |
| DPLY03/0 | STCKA7 | AF | #LDINT/ | #K1 | #NEXT8 | PER | #CONST7 | #I1 | #NEXT7 |
| DPLY04/0 | STCKA6 | TERMF | #LDSTCK/ | #K2 | #BRANCH1 | PERF | #CONST6 | #I2 | #NEXT6 |
| DPLY05/0 | STCKA5 | REQ | #G3 | #K3 | #BRANCH2 | SCLR | #CONST5 | #I3 | NEXT5 |
| DPLY06/0 | STCKA4 | EMREQ | #G4 | #K4 | #BRANCH3 | CLKEN | #CONST4 | #I4 | #NEXT4 |
| DPLY07/0 | STCKA3 | A3 | #H1 | #L1 | #BRANCH4 | NEXT9 | #CONST3 | #J1 | #NEXT3 |
| DPLY08/0 | STCKA2 | A2 | #H2 | #L2 | #BRANCH5 | LCPADF | #CONST2 | #J2 | #NEXT2 |
| DPLY09/0 | STCKA1 | A1 | #H3 | #L3 | #LCPSTL/ | STOPB | #CONST1 | #J3 | #NEXT1 |

TABLE IX-continued

| Maintenance Display Lines*** | CFE Signals Displayed With Given Display Select Codes | | | | | | | | |
|---|---|---|---|---|---|---|---|---|---|
| | DSEL8/,DSEL4/,DSEL2/,DSEL1/Values* | | | | | | | | |
| | (GRPO = 0) 1111** | 0111 | 0110 | 0101 | 0100 | 0011 | 0010 | 0001 | 0000 |
| DPLY10/0 | STCKA0 | A0 | #H4 | #L4 | #PARITY | CLKST | #CONST0 | #J4 | #NEXT0 |

NOTES:
1 = HIGH
0 = LOW
*Maintenance display line not driven by CFE with this display select code.
**With this display select code, the CFE also drives DSTAT8/0,DSTAT1/0,DLCPST/0, and DIOSND/0 (MC Group 24).
***Signals are low true on backplane.

The Common Front End also has the ability to display signals on the lines DSTAT8/0-DSTAT1/0 (Glossary Table I), which are the data link processor "status lines" to the Maintenance Card. The CFE also can display DLCPST/0 (the data link processor strobe to the Maintenance Card) and also the DIOSND/0 (which is the SEND level of I/O to the Maintenance Card). All of these lines are used by the Maintenance Card (as $20_{om}$) to test and verify the operation of the CFE card. The DSEL8/0 lines (multiplexor chip select line for input to the display lines) -- DSEL1/0 (multiplexor address line for data selection to display lines) are sent to the Common Front End card from the Maintenance Card and are used to select the CFE internal signals that are enabled on to the display lines after the data link processor has been addressed by the Maintenance Card. The Table IX shows a list of the displayable CFE signals and also the DSELn/0 line codes that are required to enable them on to the maintenance display bus.

PROM ADDRESS SELECTION

Referring to Tables Xa and Xb, the selection of micro-code addresses is implemented on the Common Front End card 10c which uses circuitry that employs standard logic gates, multiplexor chips, register chips and a decoder chip. The Multiplexors 12 drive PROM address lines A0-A9 (FIG. 4A). This causes the microcode data to be latched into the registers 14 with every 8-megahertz clock pulse.

TABLE Xa

| CFE PROM Address Selection | | | | | |
|---|---|---|---|---|---|
| PROM Output Branch Lines (#BRANCHn) | | PROM Input Address Lines (An) | | | See |
| BR6 | 54321 | 9-4 | 3-1 | 0 | Note |
| 0 | 00000 | #NEXTn | #NEXTn | #NEXT0 | 1 |
| 0 | 00001 | #NEXTn | #NEXTn | AF | 2 |
| 0 | 00010 | #NEXTn | #NEXTn | TERMF | 2 |
| 0 | 00011 | #NEXTn | #NEXTn | LCPADF | 2 |
| 0 | 00100 | #NEXTn | #NEXTn | STOPF | 2 |
| 0 | 00101 | #NEXTn | #NEXTn | TEST5 | 2 |
| 0 | 00110 | #NEXTn | #NEXTn | TEST6 | 2 |
| 0 | 00111 | #NEXTn | OPDECn | OPDEC1 | 3 |
| 0 | 01000 | #NEXTn | #NEXTn | TEST8 | 2 |
| 0 | 01001 | #NEXTn | #NEXTn | TEST9 | 2 |
| 0 | 01010 | #NEXTn | #NEXTn | TEST10 | 2 |
| 0 | 01011 | #NEXTn | #NEXTn | TEST11 | 2 |
| 0 | 01100 | #NEXTn | #NEXTn | TEST12 | 2 |
| 0 | 01101 | #NEXTn | #NEXTn | TEST12 | 2 |
| 0 | 01110 | #NEXTn | #NEXTn | TEST14 | 2 |
| 0 | 01111 | STCKAn | STCKAn | STCKA0 | 4 |
| X | 1XXXX | #NEXTn | #NEXTn | PDB MX | 5 |
| 1 | XXXXX | #NEXTn | #NEXTn | PDB MX | 5 |
| SW1/ = 0 | | Maintenance Data Bus | | | 6 |

TABLE Xa-continued

| CFE PROM Address Selection | | | | | |
|---|---|---|---|---|---|
| PROM Output Branch Lines (#BRANCHn) | | PROM Input Address Lines (An) | | | See |
| BR6 | 54321 | 9-4 | 3-1 | 0 | Note |
| BR6 | 54321 | 9-4 | 3-1 | 0 | Note |
| CLEAR | 0 | 0 | 0 | 0 | 7 |

NOTES
1 = Unconditional branch.
2 = 2-way branch (TEST5-TEST14 from PDB).
3 = 16-way branch (OPDEC from PDB).
4 = Stack branch.
5 = 2-way branch (A0 is driven directly from the PDB).
6 = Maintenance Card PROM read mode.
7 = Clear forces zeroes onto the PROM address lines.
1 = high.
0 = low.
X = don't care.

TABLE Xb

| Enable Lines For Expanded A0 Selection | | | |
|---|---|---|---|
| | PROM output branch lines (#BRANCHn) | | Enable line to Peripheral-Dependent board for expanded |
| BR6 | 5 | 4 | selection of A0 |
| 0 | 0 | 0 | |
| 0 | 0 | 1 | |
| 0 | 1 | 0 | SEL2 |
| 0 | 1 | 1 | SEL3 |
| 1 | 0 | 0 | SEL4 |
| 1 | 0 | 1 | SEL5 |
| 1 | 1 | 0 | SEL6 |

With reference to Table Xa showing the CFE signals, the primary multiplexor input-select lines are the current latched PROM outputs of #BRANCH1-#BRANCH5, Table IX and the signal term BR6 (branch line from PDB 80 for PROM address selection).

In order to accomplish Address Bit A0 Selection (at line 36, FIG. 4A): #BRANCH1-#BRANCH3 will select the input lines to two separate multiplexor chips. #BRANCH4, #BRANCH5, and BR6 will select which one of the multiplexors to use. BR6 is peripheral-type dependent and may be driven either by the PDB logic or by one of the latched PROM outputs. If a PROM output line is used to drive BR6, (Table Xb), it is sent over to the peripheral dependent board PDB 80 and then is returned as the BR6 line. There are 22 such lines, #G3-#L4, Table IX, which are available to the peripheral dependent board, PDB 80. These lines are primarily used for controlling the peripheral dependent logic on the PDB 80.

The #BRANCHn bits and BR6 are also used for the generation of PROM address lines A0-A9 (FIG. 4A). This is accomplished by the use of the term BROP (PROM address branch) and BRST (use stack register for PROM address). BROP is "high" whenever the #BRANCHn bits and the BR6 select a branch to one of 16 addresses (16-way branch). BRST is high when the #BRANCHn bits and BR6 select a branch that uses the stack register 11 as the address. If neither a 16-way or a stack register branch is selected, then either an unconditional or a two-way branch is performed.

PROM address selection can also be achieved by the use of the maintenance term SW1/, (FIG. 4C).

When the CFE $10_c$ is under the control of the Maintenance Card and the MC drives SW1/ "low", the MC can address and read any micro-code address. This feature is utilized to read and verify the contents of the PROM matrix and to test the integrity of its associated registers.

The #BRANCHn bits and the BR6 are overridden whenever a master, selective, or local clear is issued to the CFE $10_c$. Any clear condition forces the PROM address bus (A0–A9, FIG. 4A) to equal 0. The address bus A0–A9 is defined in Glossary Table I. Address 0 is the starting point of all micro-code programs.

As will be seen in Table Xa, there is a listing of all the possible branching conditions that can be used for the generation of the next PROM address. Table Xb shows a list of five CFE generated enable lines that can be used for an expanded selection of PROM address bit A0. These enable lines are activated when the PDB 80 requires additional two-way branching capabilities.

PROM PARITY CHECKING

The CFE card $10_c$ performs an odd parity check on every 49-bit PROM micro-code word. The total word length is actually 52-bits but the three most significant bits are not used by the micro-code program. These three bits are not parity checked.

The currently addressed micro-code word is latched into the register chips 14 and from these register chips is fed into cascaded parity checking chips 18 of FIG. 4A. Thus, this circuitry allows the CFE $10_c$ to examine the entire 49-bit word at one time. If the sum total of the word equals "even" parity, then the logic term PER (parity error) goes high. PER going "high" causes the parity error flip-flop 18 to be set on the next 8-megahertz clock pulse. The setting of the parity error flip-flop causes the logic term PERF/ to go "low".

PROM PARITY ERROR

If "even" PROM parity is detected by the CFE card, the logic term PER goes "high" and causes the PROM parity error flip-flop to set. At the same time that PER goes high, then PER/ goes low. PER/ going low causes the logic term CLKST (clock stop) to go high. CLKST going "high" disables the clock that controls the latching of the PROM register chips (PROMCLK/). The disabling of PROMCLK/ causes the data (that caused the parity error) to remain in the registers 14. The disabling of PROMCLK/ also locks the stack register 11 to its current value. If the parity error flip-flop gets set, then the logic term PERF/ goes low on line 41 of FIG. 4A. The PERF/ going "low" causes the following actions to occur.

1. PERF/ is routed to the peripheral dependent board PDB 80 to turn off the peripheral device.
2. The request latch 19 on the CFE card is cleared. This action causes the I/O SEND flip-flop, REQ (request), and EMRREQ (emergency request) signals from Drivers 20 to turn "off".
3. The logic term CONECT/ is forced high. This action prevents any distribution card (DC) connection and severs any DC connection that may have been in progress at the time of the error.
4. The peripheral dependent board 8-megahertz clock is turned off. PERF/ going low forces the logic term CLKEN/ high. CLKEN/ is used by the PDB 80 to permit 8-megahertz clocks.
5. The CFE 8-megahertz clocks (CLK8 and CLK8/) are turned off.

IF a PROM parity error disables (locks up) a data link processor, the error condition can be removed through the use of a base power-up clear, a Maintenance Card base clear, a Distribution Card Master Clear or a Maintenance Card initiated DLP local clear.

PERIPHERAL DEPENDENT BOARD (PDB)

The Peripheral Dependent Board (PDB) 80, is the unit which in combination with the Common Front-End Card (CFE) $10_c$ constitutes the peripheral-controller (data link processor, DLP) for interfacing the magnetic tape units to the main host computer.

The magnetic tape data link processor (MT-DLP) forms an I/O subsystem (to the main system) which includes the Master Electronic Control $50_M$ (MEC), the several DLP's $20_{00}$, $20_{01}$, etc., and the Message Level Interface $15_i$. As previously indicated, the MT-DLP consists of two cards—a Common Front-End Card (CFE) and a Peripheral Dependent Card which is called the Peripheral Dependent Board.

Basically, the Common Front-End Card $10_c$ provides: 1024 52-bit words of PROM with which to execute micro-code; 1024 17-bit words of RAM for data storage; the maintenance control logic; and a portion of the data link processor interface.

The Peripheral Dependent Board 80 provides: the bi-directional data path 101 (FIG. 5B) to the MEC $50_M$ and associated control lines; address logic for the RAM 22; RAM access logic; longitudinal parity word (LPW) parity and vertical parity generation and checking logic; the identification jumpers; a 16-bit shift register for the fabrication of DLP generated words; and associated flags and control logic.

Table I, previously cited, gives a glossary of terms for the Common Front-End Card signal lines while Table II gives a glossary of terms and signal lines associated with the Peripheral Dependent Board, PDB 80. Together these two glossaries cover the logic terms and signal lines which are used in the data link processor for the magnetic tapehost system configuration.

A general functional block diagram of a typical Peripheral Dependent Board is shown in FIG. 5A. The system Write bus is seen at the top left of FIG. 5A connecting to the RAM input data bus 52 and thence to the device data register 82 (also in FIG. 5B). The device data register 82 has a bi-directional connection to the driver receiver 84 which connects to a peripheral, such as the MEC $50_M$ (FIG. 1) and its associated tape units 53.

The RAM input data bus 52 (which connects to RAM 22 of FIG. 4A) also receives signals from: the longitudinal parity word (LPW) generator 88; from the vertical parity generator checker (part of element 83); and from a software operated code translator function circuit $83_a$. A result descriptor generator $13_a$, which is generated from the micro-code in PROM 13, FIG. 4A, also connects to the RAM input data bus 52.

In FIG. 4A the micro-code or micro-state bus 44 (PDB usage) is continued on FIG. 5A along bus 44 where micro-code inputs are directed: to the OP code decoders 83$_a$ and 83$_b$; to the RAM address units 90, 91; to the code translator 83$_a$; and to the device control register 105 onto bus 103.

As further seen in FIG. 5A, the micro-code words (from PROM 13, FIG. 4A) on the micro-state bus 44 are connected: to the result descriptor generator 13$_a$ to the vertical parity generator checker 83; to the longitudinal parity word generator 88; and to the device data register 82.

From FIG. 4A, the RAM data output bus 22$_a$ is again seen in FIG. 5A as the RAM output data bus 22$_a$. This bus connects to the host and maintenance drivers 86 which form a system read bus 10$_h$ which connects to the Distribution Card (DC) and the message level interface (MLI). The RAM output data bus 22$_a$ (from RAM 22) also provides an output channel to: the RAM address units 90, 91; to the code translator 83$_a$; to the vertical parity generator checker 83; to the LPW checker 88 and to the device data register 82.

The RAM address unit 90, 91 connects to the address bus 53 for memory selection in the random access memory (RAM) storage 22 of FIG. 4A.

Referring to FIG. 5B which shows the peripheral-controller data link processor for magnetic tape peripherals, the data line 10$_h$ to/from the host system feeds to receiver 16 (part of CFE) which includes a tri-state inverter in the Common Front-End Card (dotted square). Line 10$_{dm}$ from the Maintenance Card feeds data to a receiver 17 which includes a tri-state inverter also on the Common Front-End Card 10$_c$. The information bus 101 from the Master Electronic Control (50$_M$) feeds to a tri-state buffer 15.

The outputs of these units are connected to a Data Register flip-flop 81 which forms the receive register 81 and which feeds its output to the dual 4-1 multiplexor 83.

The jumper signals and the jumper-select signal (JMPSEL) feeds an 8-1 multiplexor 92$_p$ having an output which is fed to shift register 92. The output of shift register 92 is fed to the input of the dual 4-1 multiplexor 83. The longitudinal parity word LPW generator 88 constitutes a 512×4 PROM and a Data Register flip-flop having outputs which are fed to the dual 4-1 multiplexor 83.

The RAM 22 (located on the Common Front-End Card 10$_c$) has one input which constitutes a chip select bus 50 and a data bus 52 in addition to a RAM address (RAMAD) bus 53 and a WE/ input line. The RAM 22 has 1024 locations of 17-bits each and its output is fed to the dual 4-1 multiplexor 83.

The output of dual multiplexor 83 is bussed: to the system register (Data Register flip-flop) 85; to a Device Register flip-flop 82; to the OP decoders 83$_a$, 83$_b$ (which constitute a 512×4 PROM), and also to a dual 8-1 multiplexor 83$_c$, which provides the AO signal (low order address bit on line 36 of CFE in FIG. 4A).

The output of the system register 85 is fed to tri-state inverters 86 and 87 which have output buses 10$_h$ (host system) and 10$_{dm}$ (maintenance card). The output of flip-flop 82 is fed to driver TQN 84 while the output of PROM 83$_a$ is fed to a quad 2-1 multiplexor 83$_b$ to provide the OP decoder bus signal OPDECn.

The queue address (QAD) is developed from a comparator 89 while the system address and the peripheral address are developed from 4-bit up/down binary counters 90 and 91, respectively. The queue address data from 89 is fed to dual 4-1 multiplexor 89$_s$, the output of the system address counter 90 is fed to PROM 90$_s$ which is a 512×4 capacity PROM; another output line of the system address counter 90 is fed to comparator 90$_c$. The peripheral address data from counter 91 is fed: to PROM 91$_p$ (512×4 PROM); to comparator 90$_c$; to multiplexor 89$_s$; and to the shift register 92. The outputs of 90$_s$, 90$_c$ and 91$_p$ connect to the Common Front End Card 10$_c$.

The CONST (8 lines from micro-code to load MEC registers and control functions of shift register 89$_s$) signals are fed into a 4-bit binary counter 105 which provides one output as an interface control bus and another output to driver TQN 105$_a$, having its output line 103 to the peripheral device involved. A bus 102 connects from the peripheral device to the tri-state buffer 106$_a$. Likewise, bus 104 (PRIFnn/O) comes from the peripheral to the input of the tri-state inverter 106$_b$. The outputs of 106$_a$ and 106$_b$ are fed to a Data Register flip-flop 106$_c$ which outputs the interface status lines to the peripheral.

In FIG. 5B it will be seen that the LPW generator 88 has other inputs, such as the LPW clock, the LPW preset, the LPW word load. These signals are defined in Table IB. The receive register 81 has an input for the receiving register load line in addition to the input from the receivers 15, 16, 17. The inverter 16 has a receive (RCV/) line while inverter 17 has a simulate-receive (SIMRCV/) input line. Buffer 15 has an input designated PRCV/ for peripheral receive.

The CONST bus input to comparator 89 represents the micro-code constant lines 0-7. These originate in the micro-code and are used to determine the values to be driven when loading the MEC interface register; they also choose the function to be performed by the shift register and are used for certain QADn (individual queue address bits (n)) for representing the tape drive unit number and for assigning a queue to a magnetic tape unit.

A group of signals inputting to the up/down counter 90 are all prefixed with SAD and refer to the system address signals. The PAD inputs to counter 91 refer to the peripheral address clear and peripheral address countdown (CTD). The top input to system register flip-flop 85 is the system register load signal (SREGLD).

The operation decode (OPDEC) inputs to PROM 83$_a$ and multiplexor 83$_b$ represent the operation decode signal which reflects the decoded outputs of the ongoing present operation as presented by the output of the 16-way operation decode micro-code branch.

The CONST$_n$ lines feeding the binary counter 105 originate in the micro-code and are used to determine the values to be driven when loading the MEC interface register; they are also used to choose the function to be performed by the shift register 89$_s$ in addition to control usage for queue address bits.

The inputs GPRIF connecting to buffer 106$_a$ and tri-state inverter 106$_b$ refer to the "gated peripheral" signals and are used in peripheral simulation. When this signal is driven high, it causes the MEC-related signals to be diverted to the Maintenance Card control.

The XMIT signal to flip-flop 82 is the transmit signal which enables the transmit register-driver 84 to load and drive the INFOnn lines to the MEC 50$_M$ and the mag-tape peripherals.

The inputs to shift register 92 designated with the prefix SH refer to shift signals such as shift clock, shift-down bit (SHDBIT), to shift up (SHU) and shift down (SHD).

The MUXSEL lines to multiplexor 83 are the multiplexor select lines such as "multiplexor select A". This signal is used, in combination with "MUXSLB", to select the RAM 22, the shift register 89$_s$, the receive register 16, or the LPW register 88, or to drive the INRAM bus 52.

RECEIVE REGISTER

Referring to FIG. 5B the receive register 81 can accept a 17-bit word (via receivers 15, 16, 17) from: the host system 10 on bus 10$_h$ (DATAnn/O); the peripheral unit on peripheral bus 101 (INFOnn), or from the Maintenance Card 20$_{om}$ (DSIMnn/O) on bus 10$_{dm}$.

Source selection is accomplished by activating one, and only one of the tri-state receivers 15, 16, 17 at a time via the PRCV/ (Peripheral Receive) RCV/ (Receive Enable), or SIMRCV (Simulate Receive) lines, respectively. In the receive mode (RCV), data from the host system 10 is loaded into the receive register 81 by the leading edge of an AF pulse (Table I). In the receive-from-peripheral mode (PRCV), the receive register 81 is loaded by the leading edge of a synchronized peripheral clock pulse (Q2). In the maintenance mode (SIMRCV), the receive register 81 is loaded by either the leading edge of AF (if the Maintenance Card MC is simulating the MLI), or the leading edge of Q2 (if the MC is simulating the peripheral). The receive register 81 remains valid until clocked again, unless cleared by a data link processor (DLP "clear" command).

TRANSMIT REGISTER

The transmit register 82, in FIG. 5B is a 17-bit wide register used to deliver words to the peripheral unit through the Master Electronic Control MEC 50$_M$. The transmit data register 82 is loaded from the multiplexor 83 (MUX) output by the rising edge of the micro-code signal #TREGLD (#L2), of Table VIb. The outputs of the transmit register 82 drive the transistors 84 (TQN) which provide a non-inverting transistor-type-logic (TTL) to CTL (complementary transistor logic) conversion. The transmit data register 82 is cleared to all zeros when the XMIT signal goes "low", allowing the peripheral via MEC 50$_M$ to drive the INFOnn lines 101. When the signal XMIT is low, no loading of the register 82 can occur. New outputs are valid on the INFOnn lines, within 55 nanoseconds, following the active edge of the DLP clock.

SYSTEM REGISTER

In FIG. 5B the system register 85 is a 17-bit wide register used to deliver words to the message level interface 15$_i$ (FIG. 1) and/or the Maintenance Card (MC) 20$_{om}$, with selection controlled by the SND (DLP driving INFO lines to MEC 50$_M$) and SIMSND (simulate send) lines. As mentioned in the glossary of Table IB, the SND is the "send enable" signal while the SIMSND is the "simulate send" signal. Gates 86 and 87, respectively, control the use of these signal lines to the host system (DATAnn/O) or the Maintenance Card units (DSIMnn/O). The output of the system register 85 will also be seen to provide data to the longitudinal parity word generator 88.

The system register 85 is loaded on the falling edge of the micro-code PROM output signal #SREGLD (#H4) of Table VIb or, during the burst mode (with #SREGLD held "high") by the leading edge of AF. The worst case elapsed time from clock edge to "data valid" on the backplane is 81 nanoseconds for the #SREGLD command and is 89 nanoseconds for the "read burst" mode. The system register 85 is cleared to all zeros by a DLP clear command.

QUEUE STORAGE

As will be seen in FIGS. 5B and 5C, and FIG. 4A, a random access memory (RAM 22) is used to provide 16 different areas of memory which are utilized as magnetic tape unit scratchpads, that is to say, one memory scratchpad for each one of 16 possible magnetic tape transport units 53 of FIG. 1. These memory areas have been designated as "queues" and are used to store the I/O descriptors, the result descriptors, the descriptor links and various logical flags for each individual tape transport unit. Each of these queues is addressed by special logic called the queue-address register QAD 89. The queue address register 89 is loaded by the 4-bit "C" field and cleared by the queue address clear line QADCLR. The unit number (0-15) of the magnetic tape transport drive is used to address the correct queue.

FIG. 5C illustrates the organization of a queue. Each queue is divided into 16 parts labeled Q0 through Q15 and consisting of 17-bits each, as shown horizontally across the top of the diagram with the first or lowest order bit designated P as the parity bit. Q0-Q15 are used to store information as indicated by the horizontal lines opposite each Q position.

LONGITUDINAL PARITY WORD GENERATOR

The longitudinal parity word (LPW) generator 88 maintains a running longitudinal parity word on all messages transferred between the data link processor (DLP) and the message level interface 15$_i$ (MLI) of the host system. In the send mode (IOSF=high), the resulting LPW word is also transmitted. In the receive mode (IOSF=low), the last word from the host system 10 (the host system generated LPW) is clocked in and, if there are no transmission errors, an "all zeros" word (16-bits) results, which may then be detected by the 0 test bit.

With #FLAGCLR/ (#L1) Table VIb, held "high", the output of the PROM state 13 (FIG. 4A) is the logical Exclusive OR of the transmit register 83 and the LPW register 88 outputs. With #L1 low, the PROM 13 output is forced to 0. The LPW register 88 is loaded from the PROM outputs on the falling edge of #SREGLD (rising edge of #H4, Table VIb).

The LPW register 88 must be pre-set to all ones prior to commencing a message transfer in order to attain a valid LPW tally. This is done by raising #LPWPRE (#L-3), which forces the LPW PROM outputs high, and clocking the LPW register via the #SREGLD/ (#H4) signal. As will be noted in Table II, the signal SREGLD represents the "system register load". The signal #L1 (Table VIb) must be held "high" throughout the message transfer.

The LPW and the Vertical Parity Error Flags are associated with the LPW generator 88 and are defined as follows:

LPWERR: this is the longitudinal parity word error signal flag. It is loaded by the falling edge of #LPWPRE (#L3) in the receive RCV mode only. When "high", it indicates a non-zero LPW check caused by a longitudinal parity error on a message from the host system message level interface 15$_i$.

SYSVPAR: this signal is the system vertical parity error signal flag. It is loaded on the same edge as the system register 85, in the receive mode only. When "high", it indicates detection of a vertical parity error in a word received from the host system's message level interface 15$_i$.

PERVPAR: this is the peripheral vertical parity error signal flag. It is loaded on the falling edge of #DATAVK (#J2), in the PRCV mode only. When "high", it indicates detection of vertical parity error in a word received from the peripheral device or the Master Electronic Control.

All three flags are cumulative until cleared to zero by a low level signal on #FLGCLR/ (#L1).

RAM ADDRESSING

The RAM 22 is located on the Common Front End card 10$_c$. Its timing, usage and partitioning are completely dependent on the peripheral dependent board (PDB) 80, and the particular micro-code requirements. The write-enable (WE/) pulse is generated from the micro-code signal #RAMWE (#H1), although it is driven low only during the last half of the cycle. This allows the address and input to become stable prior to the write command. The RAM 22 is enabled for "read and "write" functions by setting the chip select (CS/) low.

As seen in FIG. 5B there are three address registers, the queue register 89, the system address register 90, and the peripheral address register 91. These three registers are designated as QAD, SAD and PAD. Any one of these three address registers may be selected for addressing the random access memory RAM 22. These addresses are selected by using various combinations of two microword signals: #ADDSLA (#K1) and #ADDSLB (#K2) in Table VIb. The address selection using these two signals is shown in Table XI.

| #ADDSLB | #ADDSLA | Selected Address Register |
|---------|---------|---------------------------|
| 0 | 0 | System address (SAD) |
| 0 | 1 | Peripheral address (PAD) |
| 1 | 0 | Queue Address (QAD) |
| 1 | 1 | Invalid |

The RAM address is valid within 37 nanoseconds following the clock edge if the selected address was already stable. Table XII shows several functions regarding the address registers which are encoded into the shown function-select bits. Only one of the seven active functions shown in Table XII may be selected during a micro-word cycle. Each function output is asserted only during the last half of each cycle and can, therefore, be repeated on consecutive cycles.

TABLE XII

| | Encoded Functions | | |
|---|---|---|---|
| #FSEL4 | FSEL2 | FSEL1 | Output |
| 0 | 0 | 0 | Inactive |
| 0 | 0 | 1 | QUECLR |
| 0 | 1 | 0 | SHFTCLR |
| 0 | 1 | 1 | PADCTD |
| 1 | 0 | 0 | PUSH |
| 1 | 0 | 1 | SADLD |
| 1 | 1 | 0 | SADCTD |
| 1 | 1 | 1 | ADDCLR |

TABLE XII-continued

| | Encoded Functions | | |
|---|---|---|---|
| #FSEL4 | FSEL2 | FSEL1 | Output |
| ADDCLR clears SAD and PAD. | | | |

The system address register 90 may be used for accessing the RAM buffers 22 and/or be loaded into the C and D digits of the word generator 92 (8 least significant bits only). The SAD 90 is a nine-bit presettable up/down binary counter. It may be cleared to all zeros using the ADDCLR signal. It may be loaded from the A and the B digits of the INRAM bus 100 via the ADDLD/ signal (address load). A "count up" results from the falling edge of #SADCTU (#H3, Table VIb) or, during burst mode, with #H3 held high, from the leading edge of AF (strobe I/O has been received). The system address register SAD 90 has "up counts" which cannot be executed on consecutive micro-word cycles. Consecutive down-counts, however, are allowed using the SADCTD/ signal (system address count down). Since only the least significant 8-bits are loaded, an ADDCLR/ function must precede the loading of any byte to be used as an address, to avoid possible ambiguity in the SAD 8 (most significant counting) bit.

The output of the system address register SAD 90 is compared with the output of the peripheral address register PAD 91 to generate the ADDEQ (address equal) flag, indicating equal counts in the two registers. Another set of flags, collectively called BUFLIM, are assigned to specific addresses. BUFLIM may be tested directly, and/or used to stop a burst mode transfer via the BUFFEND/ signal to the Common Front-End Card (CFE). The RAMAD 9 signal is equal to the BUFSEL (buffer select) bit, stored in the peripheral interface while the SAD 90 is selected.

The peripheral address register PAD 91 may be used for accessing the RAM buffers 22 and/or loaded into the A and B digits of the word generator 92 (8 least significant digits only). The peripheral address register 91 may be seen as a 9-bit presettable up/down counter. It may be cleared to all zeros using the ADDCLR/signal. It may be loaded from the C and D digits of the INRAM bus 100 via the PADLD/signal. Up-counts or down-counts can be executed using the #PADCTU (#G4) or #PADCTD signals, respectively. As only the least significant 8-bits are loaded, an ADDCLR/function must precede the loading of any byte to be used as an address, as in the SAD 90. The output of the PAD 91 is compared with the output of the SAD 90 to detect the ADDEQ situation, (address equal). The BUFDONE (buffer limit) flag group is assigned to specific peripheral addresses and, when detected causes a "one" to be shifted up into the poll register 90$_s$. RAMAD 9 is equal to the BUFSEL bit while the PAD is selected.

The queue address (QADn, representing the tape drive unit number for assigning a queue to a magnetic tape unit) consists of a 4-bit binary counter 89 and 6-bits from the #CONSTn field. When the QAD is selected, RAMAD 9 and RAMAD 8 are driven by #CONST 5 and #CONST 4, respectively selecting one of the four RAM quadrants. At the end of a cycle where #SHFTOP (#I1) is high and #CONST 7 is low, the most significant four of the remaining 8-bits are loaded from the C digits of the INRAM bus 100. This same digit is incremented at the end of a cycle where #I1 and #CONST 6 are both high. The digit is cleared to zero via the QUECLR/signal. Consecutive up-counts are allowed. The lower digit of the QAD is dictated from the micro-code using #CONST 3 (most significant bit), #CONST 2, #CONST 1, and #CONST 0 (least significant bit).

The selection of any of the 16 queue areas can be loaded or counted into the "queue register" while the selection of any of 16 specific locations within the area is made via the micro-code.

WORD GENERATOR

The word generator register 92 employs bit and byte manipulation to produce custom words within the data link processor. The word generator is composed of several stages of shift register.

The various words are formed by loading and/or shifting the bits to get the required word format. The work generator register 92 is clocked at the end of each cycle for which the shift operation #SHFTOP (#I1) is held high. Consecutive operations are allowed. The register is 16-bits wide and is divided into two individually controlled 8-bit bytes. The #CONSTn field is used to select the operation to be performed. This is shown in Table XIII. A byte-swap function is performed on each word loaded from the PAD/SAD registers. This operation can be repeated to obtain the original word, if required. The first-installed jumpers can be assigned, as required, for each data link processor ID. Each jumper can be selected for loading into the word generator as part of a custom word or for bit testing.

MULTIPLEXOR (DATA PATH)

The data path multiplexor 83 operates to select one of four possible sources to drive the INRAM bus 100. The following Table XIV indicates the four sources which may feed the bus 100. These sources are the LPW generator register 88, the receive register 81, the shift register and word assembler 92, and the RAM 22 output. The INRAM 100 lines are valid within 43 nanoseconds following the active clock edge, if the selected source is already stable.

TABLE XIV

| INRAM Bus Source Selection | | |
|---|---|---|
| #K3 | #K4 | Source |
| 0 | 0 | LPW register |
| 0 | 1 | Receive register |
| 1 | 0 | Shift register |
| 1 | 1 | RAM output |

MICRO-CODE BRANCH TESTING

Testing is done in the magnetic tape data link processor to provide micro-code program branch selection. Testing can be performed on words, bytes, bits, or flags. Branching can be 2-way or 16-way. Branching is accomplished by using the symbolic #BRANCHn field to select a bit (or set a bit) which is used, in turn, to modify the next address field. The branching assignments for the magnetic tape data link processor set are shown in Table XV on test bit selection.

TABLE XIII

Shift Register Control

| #CONST | | | | | | | | Register | Function | Input |
|---|---|---|---|---|---|---|---|---|---|---|
| 7 | 6 | 5 | 4 | 3 | 2 | 1 | 0 | | | |
| 1 | 0 | 0 | 0 | 0 | 0 | 0 | 0 | All 3 | No change | |
| 0 | — | — | — | — | — | — | — | Queue | Load | INRAMC☐ |
| 1 | 1 | — | — | — | — | — | — | Queue | Increment | |
| — | — | 0 | 0 | — | — | — | — | Upper Byte | No change | |
| — | — | 0 | 1 | 0 | — | — | — | Upper byte | Shift down | 0 |
| — | — | 0 | 1 | 1 | — | — | — | Upper byte | Shift down | 1 |
| — | — | 1 | 0 | — | — | — | — | Upper byte | Shift up | WDC8 |
| — | — | 1 | 1 | — | — | — | — | Upper byte | Load | PAD |
| — | — | — | — | — | 0 | 0 | — | Lower byte | No change | |
| — | — | — | — | — | 0 | 1 | 1 | Lower byte | Shift down | SHDBIT |
| — | — | — | — | — | 1 | 0 | 0 | Lower byte | Shift up | 0 |
| — | — | — | — | — | 1 | 0 | 1 | Lower byte | Shift up | 1 |
| — | — | — | — | — | 1 | 1 | — | Lower byte | Load | SAD |

NOTES
1. — = Don't care. The bit is not used.
2. Upper byte = A and B digits of the shift register.
3. Lower byte = C and D digits of the shift register.
4. Queue = Queue address register, four bits.
5. INRAMC☐ = C digit of INRAM bus.
6. SHDBIT = Selected jumper input bits.
7. PAD, SAD = Least significant eight bits only.
8. Up = Toward the most significant bit (A8).
9. Down = Toward the least significant bit (D1).

TABLE XV

Test Bit Selection (AO)

| #BRANCH3 | #BRANCH2 | #BRANCH1 | (SELB1) | (SELB2) | (SEL2) | (SEL3) | (SEL4) | (SEL5) | #BRANCH6 (#L4) |
|---|---|---|---|---|---|---|---|---|---|
| | | | 0 | 0 | 0 | 0 | 1 | 1 | |
| | | | 0 | 0 | 1 | 1 | 0 | 0 | #BRANCH5 |
| | | | 0 | 1 | 0 | 1 | 0 | 1 | #BRANCH4 |
| 0 | 0 | 0 | #NEXT0 | SELECT | ZERO | RDYST | INRAMC8 | INRAMA8 | |
| 0 | 0 | 1 | AF | ADDEQ | TRMBRST | READY | INRAMC4 | INRAMA4 | |
| 0 | 1 | 0 | TERMF | SADZERO | PERVPAR | BUSY | INRAMC2 | INRAMA2 | |
| 0 | 1 | 1 | LCPADF | SADBRW | SYSVPAR | SPARE | INRAMC1 | INRAMA1 | |
| 1 | 0 | 0 | STOPF | FLAGC | LPWERR | Q2 | INRAMD8 | INRAMB8 | |

TABLE XV-continued

| #BRANCH3 | #BRANCH2 | #BRANCH1 | (SELB1) | (SELB2) | (SEL2) | (SEL3) | (SEL4) | (SEL5) | #BRANCH6 |
|---|---|---|---|---|---|---|---|---|---|
| | | | 0 | 0 | 0 | 0 | 1 | 1 | (#L4) |
| | | | 0 | 0 | 1 | 1 | 0 | 0 | #BRANCH5 |
| | | | 0 | 1 | 0 | 1 | 0 | 1 | #BRANCH4 |
| 1 | 0 | 1 | BUFLIM/ | PARERR/ | DATAV | P4 | INRAMD4 | INRAMB4 | |
| 1 | 1 | 0 | EQ + LIM | SEMREQ | FLAGB | (P3@SELECT)/ | INRAMD2 | INRAMB2 | |
| 1 | 1 | 1 | OPDEC1 | STACKA0 | FLAGA | P1 | INRAMD1 | INRAMB1 | |

Word testing is performed on the 16 data bits of INRAM bus 100 to generate the ZERO flag for the LPW checking and the new vertical parity (NVP) which is also used for parity checking (PARERR).

The magnetic tape data link processor uses FLAGA to detect non-binary coded digits (non-BCD) in the space count (of space operation) when binary coded decimal (BCD) values are required. The various testing of bits of INRAM bus 100 and the various flags are defined in Table XV above. The OP code set allows a 16-way branch on the A and B digits of the INRAM bus when (#OPDEC) (#J1) is held high. With #OPDEC low, a 16-way branch is produced by the combination of AF, STOPB/, DATAV, and P3SELECT, which is necessary for handling both interfaces concurrently.

PERIPHERAL INTERFACE

The peripheral interface of the peripheral dependent board (PDB) is DTL (diode-type logic) compatible. This peripheral interface consists of 25 lines: 17 bi-directional lines 101, 5 receive-only lines 102, and 3 transmit-only lines 103. In FIG. 5B, the 17 bi-directional lines are designated 101, the 5 receive-only lines are designated 102, and the 3 transmit-only lines are designated 103.

The magnetic tape data link processor uses all 17 bi-directional lines for data words together with parity, 4 receive lines (RDYST, CLOCK . . . 1, BUSY and READY) and 2 transmit lines (SELECT and SEND). One receive line and one transmit line are not used.

The four receive-only lines carry status and/or timing information from the peripheral 53 and MEC $50_M$ to the data link processor as $20_{03}$.via buffer $106_a$ and inverter $106_b$. Each line can be simulated for maintenance purposes via the PRIFnn/0 line 104 while GPRIF is held high by the maintenance card (MC). Because the interface itself is asynchronous, each of the 5 incoming signals is synchronized through two stages of a data register $106_c$ prior to appearing as a test flag bit. In addition, the synchronized peripheral clock signal Q2 is used to load the receive register 81 when the data link processor is in the PRCV mode (peripheral receive mode). Further, detection of the trailing (falling) edge of the peripheral clock pulse sets the DATAV (data available) flag. DATAV can be reset by raising #DATAVK (#J2) listed on Table VIb.

The two transmit-only lines 103 (SEND and SELECT) along with XMIT, ABANDON, CS/, BUFSEL and IGNORE are loaded into the peripheral interface driver register $105_a$ from the #CONSTn field at the end of each cycle where #PINTLD/ (#J3) is held low. With ABANDON loaded "high", the detection of a BUSY* READY/ condition automatically clears the SEND, SELECT and XMIT lines to zero. Loading the IGNORE bit "low", allows a host-system connect to override the PRCV mode and enter the RCV mode in anticipation of receiving a strobe (STIOL) and therefore a word from the host system 10. With the IGNORE bit set "high", the data link processor (DLP) ignores a host system connect while at the same time receiving PRCV mode from the peripherals 53, $50_M$. Loading the chip select signal CS/ "high" disables the RAM 22.

POLL REGISTER

The poll register $83_p$ and its associated poll flags P1, P3, and P4 are provided to monitor the buffer RAM 22 status in determining when to set "poll request" or to set "emergency request" and/or when to flag "access error". (There is no logical P2 flag).

During a "read" operation each time a buffer of RAM 22 is filled by the peripheral (53 via $50_M$) a "one" (high) is automatically shifted, or pushed, into the poll register $83_p$. Concurrently, as each buffer of the RAM 22 is unloaded by the host system 10, a zero (low is shifted down (using #H2) into the poll register, popping a "one" out. Thus, when the bottom bit P1 is tested and found "high", a buffer of the RAM 22 is ready for the host system 10 and a poll request is generated.

If P3 is found "high", indicating that 3 of the 4 buffers are full, an emergency request is generated if the tape is still active (that is, the magnetic tape data link processor is receiving information). If P4 is found "high", it indicates all four buffers were filled before the host system 10 responded and an "access error" is indicated in the result descriptor. This logical scheme results in the peripheral (53 and $50_M$) trying to keep the buffers full and the host system trying to empty them.

In a "write" operation, the magnetic tape data link processor fills all four RAM buffers with data from the host system 10 (unless terminated) before starting the tape motion. Then each time the MEC $50_M$ takes a buffer full of data for a selected magnetic tape unit, a "one" is pushed in the poll register. Each time the host system 10 fills another buffer, a "one" is popped out. Thus, the same technique is used for "read" operations as is used for write operations to update and test the poll flags. This logical scheme results in the host system trying to keep the buffer full (having a head start) and the peripheral trying to empty the data from the buffer.

There has thus been described a data transfer network using a modularized I/O subsystem which can intercommunicate with a variety of different host computer systems while operating and maintaining itself with its own architecture and circuitry.

The data link processors, which form one building block of the subsystem, can connect and disconnect to a host system and perform data transfer operations to/from peripherals and host, while freeing the host to perform other operations during I/O subsystem operation. Each data link processor has been modularized into basically two printed circuit cards, one card for functions common to all types of data link processors, and one card for handling the specific requirements and protocol for a particular type of peripheral terminal.

What is claimed is:

1. A peripheral-controller for operation in a system which includes a main host computer and a plurality of magnetic tape transport units, said peripheral controller is housed in a base module which provides distribution control circuitry to connect and disconnect peripheral controllers to said main host computer and maintenance circuitry to test the operation of such peripheral-controllers, said peripheral-controller comprising:

(a) common control circuit means including:
   (a1) control store means for storing micro-code word operators, each of said word operators being separately addressable and selected by control data from a peripheral dependent circuit means;
   (a2) means connected to generate a current-address to said control store means to select a first micro-code word operator, said generation means receiving control data from said peripheral dependent circuit means;
   (a3) means to generate the next forthcoming micro-code word operator;
   (a4) stack register means to temporarily hold the current address of said first micro-code word operator;
   (a5) latching register means to temporarily store and convey said micro-word operator to said peripheral dependent circuit means for execution of said operator;
   (a6) connection means to signal access-requests to said host computer;
   (a7) bus means to receive data from and to transmit data to said main host computer;
   (a8) additional bus means to receive data from and to transmit data to selected magnetic tape transport units;
   (a9) RAM buffer means to temporarily store data being transferred between a selected magnetic tape transport unit and said host computer said buffer means being controlled by signals from said peripheral dependent circuit means;

(b) said peripheral dependent circuit means including:
   (b1) bi-directional data path means to a selected magnetic transport unit;
   (b2) address logic means for formulating addresses for the read-out and write-in of data in said RAM buffer means;
   (b3) multiplexor means for selecting a source of data that is to be transmitted to said RAM buffer means;
   (b4) means to set a unique address to identify said peripheral dependent circuit means;
   (b5) word generation shift register means to provide control and information data to said host computer and to a selected magnetic tape transport unit;
   (b6) logic means for executing micro-code word operators received from said latching register means.

2. The magnetic tape peripheral controller of claim 1 wherein said peripheral dependent circuit means also includes:

(i) a system address register for accessing data in said RAM buffer means for said main host computer;
(ii) a peripheral address register for accessing data in said RAM buffer means for a selected magnetic tape transport unit;
(iii) a queue address register for addressing dedicated areas of said RAM buffer means containing control data applicable to each selected magnetic tape transport unit.

3. The magnetic tape peripheral controller of claim 2 which includes:

(iv) comparator means to compare the amount of data, in said RAM buffer means, transferred out with the amount of data transferred in in order to maintain a balance of these amounts of data.

4. The magnetic tape peripheral controller of claim 2 wherein said RAM buffer means includes:

a plurality of dedicated storage areas, each area reserved for control data pertaining to a selected one of the plurality of magnetic tape transport units, for storage of task commands, descriptor links which identify the task command, result-descriptors which signify the task as complete or incomplete, and logical flags.

5. The magnetic tape peripheral controller of claim 4 wherein a selected magnetic tape transport unit may access its dedicated area in said RAM buffer means through said queue address register.

6. The magnetic tape peripheral controller of claim 3 which includes:

(v) poll register and flag means to monitor the amount of data in said RAM buffer means, and to signal, if necessary an emergency request for access to said main host computer.

7. The magnetic tape peripheral controller of claim 6 wherein said poll register and flag means includes:

means to signal an access error when said RAM buffer means is incapable of accommodating the amount of data being transmitted to it.

8. The magnetic tape peripheral controller of claim 6 wherein said RAM buffer includes; a plurality of sub-buffer areas for storage of data being transferred, and said poll register means includes:

means, during read-operations, to shift a bit into the poll register each time a sub-buffer area is filled with data from a selected magnetic tape transport unit, and to remove a bit each time a sub-buffer area is unloaded to said main host computer.

9. The magnetic tape peripheral controller of claim 8 which includes:

means to test said poll register means for presence of a bit therein, and, if found, to signal an access request to said host computer system.

10. The magnetic tape peripheral controller of claim 8 which includes:

means to test said poll register means for bits which indicate that more of the sub-buffers are full of data than are not-full, and if so indicated, to generate an emergency request signal for access to said main system.

11. The magnetic tape peripheral controller of claim 9 which includes:

means to test if all sub-buffer areas are full of data before the main host system has provided access to receive the data, and if so indicated, to signal an access error in the result descriptor word for the magnetic tape transport unit which filled the sub-buffer areas.

12. The magnetic tape peripheral controller of claim 8 which includes:

means, during write operations, to shift a bit into said poll register means when a selected magnetic tape transport unit accepts a sub-buffer of data and to remove a bit when said host system fills a sub-buffer of data.

13. The magnetic tape peripheral controller of claim 8 wherein said peripheral controller includes means for filling all sub-buffers of said RAM buffer means with data before signalling a start of tape motion for a selected magnetic tape transport unit.

* * * * *

UNITED STATES PATENT AND TRADEMARK OFFICE
CERTIFICATE OF CORRECTION

PATENT NO. : 4,280,193
DATED : July 21, 1981
INVENTOR(S) : Kenneth W. Baun and Jimmy G. Saunders It is certified that error appears in the above—identified patent and that said Letters Patent is hereby corrected as shown below:

```
Col.  1, line 61, change "modulates" to --modules--.
Col.  2, line 55, change "micro-card" to --micro-code--.
Col.  4, line 13, change "peripheralcontrollers" to
                  --peripheral-controllers--.
Col.  5, line 42, change "circit" to --circuit--.
Col.  6, line 41, change "wich" to --which--.
Col. 13, line 30, change "on" to --and--.
Col. 33, line 38, change "germ" to --term--.
Col. 42, line 18, change "#LDSICK/." to --#LDSTCK/.--;
                  change "#LDSICK/" to --#LDSTCK/--;
         line 20, change "lowenable" to --low-enable--;
         line 25, change "#LDSICK/", both occurrences, to
                  --#LDSTCK/--;
         line 29, change "#LDSICK/" to --#LDSTCK/--;
         line 37, change "#LDSICK/" to --#LDSTCK/--.
Col. 46, line 50, change "tapehost" to --tape-host--.
```

Signed and Sealed this

First Day of December 1981

[SEAL]

Attest:

GERALD J. MOSSINGHOFF

Attesting Officer

Commissioner of Patents and Trademarks